US012107349B2

(12) United States Patent
Wang et al.

(10) Patent No.: US 12,107,349 B2
(45) Date of Patent: Oct. 1, 2024

(54) WIRELESS COMMUNICATION SYSTEMS HAVING PATCH-TYPE ANTENNA ARRAYS THEREIN THAT SUPPORT LARGE SCAN ANGLE RADIATION

(71) Applicant: CommScope Technologies LLC, Hickory, NC (US)

(72) Inventors: Huan Wang, Richardson, TX (US); Vadim Zlotnikov, Dallas, TX (US); Michael Brobston, Allen, TX (US); Chengcheng Tang, Murphy, TX (US); Samantha L. Merta, Richardson, TX (US); Peter J. Bisiules, LaGrange Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 325 days.

(21) Appl. No.: 17/611,399

(22) PCT Filed: May 15, 2020

(86) PCT No.: PCT/US2020/033016
§ 371 (c)(1),
(2) Date: Nov. 15, 2021

(87) PCT Pub. No.: WO2020/242783
PCT Pub. Date: Dec. 3, 2020

(65) Prior Publication Data

US 2022/0200151 A1 Jun. 23, 2022

(51) Int. Cl.
*H01Q 9/04* (2006.01)

(52) U.S. Cl.
CPC ......... *H01Q 9/0435* (2013.01); *H01Q 9/0457* (2013.01)

(58) Field of Classification Search
CPC ..................... H01Q 1/38; H01Q 9/0407–0457
See application file for complete search history.

(56) References Cited

U.S. PATENT DOCUMENTS

| | | | |
|---|---|---|---|
| 4,761,654 | A | 8/1988 | Zaghloul |
| 7,283,101 | B2 | 10/2007 | Bisiules et al. |

(Continued)

FOREIGN PATENT DOCUMENTS

| | | | |
|---|---|---|---|
| CN | 110098477 A | | 8/2019 |
| EP | 3065217 A1 | | 9/2016 |

(Continued)

OTHER PUBLICATIONS

Notification of Transmittal of the International Search Report and the Written Opinion of the International Searching Authority, or the Declaration, in corresponding PCT Application No. PCT/US2020/033016 (Nov. 18, 2020).

(Continued)

*Primary Examiner* — Hasan Islam
(74) *Attorney, Agent, or Firm* — Myers Bigel, P.A.

(57) ABSTRACT

An antenna includes a cross-polarized feed signal network configured to convert first and second radio frequency (RF) input feed signals to first and second pairs of cross-polarized feed signals at respective first and second pairs of feed signal output ports. A feed signal pedestal is provided, which is electrically coupled to the first and second pairs of feed signal output ports, and a patch radiating element is provided, which is electrically coupled by the feed signal pedestal to the first and second pairs of feed signal output ports. This patch radiating element may be capacitively coupled to first and second pairs of feed signal lines on the feed signal pedestal, which are electrically connected to the first and second pairs of feed signal output ports.

16 Claims, 30 Drawing Sheets

(56) References Cited

U.S. PATENT DOCUMENTS

| | | | | |
|---|---|---|---|---|
| 10,297,927 | B2 * | 5/2019 | Amadjikpe | H01Q 21/22 |
| 11,223,131 | B2 * | 1/2022 | Schühler | H01Q 9/0457 |
| 11,276,926 | B2 * | 3/2022 | Yun | H01Q 1/48 |
| 2004/0104847 | A1 | 6/2004 | Killen et al. | |
| 2006/0232490 | A1 | 10/2006 | Bisiules et al. | |
| 2011/0260941 | A1 | 10/2011 | Jones et al. | |
| 2015/0084814 | A1 * | 3/2015 | Rojanski | H01Q 21/065 342/368 |
| 2015/0084826 | A1 | 3/2015 | Lea et al. | |
| 2018/0108989 | A1 | 4/2018 | De Flaviis et al. | |
| 2018/0212324 | A1 | 7/2018 | Tatomir | |
| 2019/0044238 | A1 * | 2/2019 | Schühler | H01Q 9/0457 |

FOREIGN PATENT DOCUMENTS

| | | | |
|---|---|---|---|
| WO | 2016131496 | A1 | 8/2016 |
| WO | 2018209600 | A1 | 11/2018 |
| WO | 2020072880 | A1 | 4/2020 |

OTHER PUBLICATIONS

Sevskiy et al. “Air-Filled Stacked-Patch Antenna” (Jan. 2003).

Yang et al. “A Wide-Angle E-Plane Scanning Linear Array Antenna with Wide Beam Elements” IEEE Antennas and Wireless Propagation Letters 16:2923-2926 (2017).

Yang et al. “Study on Wide-Angle Scanning Linear Phased Array Antenna” IEEE Transactions on Antennas and Propagation 66(1):450-455 (Jan. 2018).

Extended European Search Report Corresponding to European Application No. 20813169.8 (19 pages) (May 2, 2023).

* cited by examiner

WIRELESS COMMUNICATION SYSTEMS HAVING PATCH-TYPE ANTENNA ARRAYS THEREIN THAT SUPPORT LARGE SCAN ANGLE RADIATION

CLAIM OF PRIORITY

This application is a 35 U.S.C. § 371 national stage application of PCT Application No. PCT/US2020/033016, filed on May 15, 2020, which claims priority to U.S. Provisional Application No. 62/852,564, filed May 24, 2019, U.S. Provisional Application No. 62/853,489, filed May 28, 2019, and U.S. Provisional Application No. 62/863,337, filed Jun. 19, 2019, the disclosures of which are hereby incorporated herein by reference. The above-referenced PCT Application was published in the English language as International Publication No. WO 2020/242783 A1 on Dec. 3, 2020.

FIELD OF THE INVENTION

The present invention relates to antenna devices and, more particularly, to patch-type radiating elements and antenna arrays for wireless communication systems.

BACKGROUND

Beam forming antennas can often require relatively large scan angles of up to ±60° away from the boresight of an antenna reflector. Unfortunately, traditional base station antennas are typically unable to realize such large ±60° scan angles because of the relatively narrow beamwidth of the radiating element patterns, relatively poor active return losses, relatively poor isolation between the orthogonal polarizations (self-ISO), and relatively poor isolation between adjacent radiating elements (inter-ISO).

Alternatively, air-filled patch antennas as well as multi-layer patch antennas often have relatively broad bandwidths relative to single-layer patch antennas with solid substrates, but typically suffer from higher cost and structural instability. One example of a multi-layer air-filled patch antenna defined by a micro-strip annular ring is disclosed at FIGS. 2*a*-2*c* of commonly assigned U.S. Pat. No. 7,283,101 to Bisiules et al., the disclosure of which is hereby incorporated herein by reference. Another example of an multi-layer air-filled patch antenna is disclosed in an article by S. Sevskiy et al., entitled "*Air-Filled Stacked-Patch Antenna*," (see, e.g., http://hft.uni-duisburg-essen.de/INICA2007/2003/archive/inica_2003/2.2_Sevskiy.PDF). Unfortunately, this stacked patch antenna may suffer from relatively high cost, large aperture and height and relatively narrow beamwidth.

A wide-angle scanning linear array antenna is disclosed in an article by G. Yang et al., entitled "*Study on Wide-Angle Scanning Linear Phased Array Antenna*," IEEE Trans. on Antennas and Propagation, Vol. 66, No. 1, January 2018, pp. 450-455. As illustrated by FIG. 1 of Yang et al., a relatively wide beamwidth antenna may include a driving microstrip antenna with electric walls over a ground plane. Based on this configuration, a horizontal current of the microstrip antenna is produced on a radiating patch, whereas a vertical current is induced on the electric walls by the E-fields of the microstrip antenna. As will be understood by those skilled in the art, the vertical metallic walls help to support relatively wide beamwidths and relatively large scan angles for an array, however, only single polarization radiation is possible. These characteristics of a phase array antenna are also disclosed in an article by G. Yang et al., entitled "*A Wide-Angle E-Plane Scanning Linear Array Antenna with Wide Beam Elements*," IEEE Antennas and Wireless Propagation Letters, Vol. 16, (2017), pp. 2923-2926.

SUMMARY OF THE INVENTION

Antenna arrays according to embodiments of the invention utilize reduced-size patch-type radiators to support wider scan angles and wider beamwidths. In some of these embodiments of the invention, an antenna includes a cross-polarized feed signal network, which is configured to convert first and second radio frequency (RF) input feed signals to first and second pairs of cross-polarized feed signals at respective first and second pairs of feed signal output ports, and a feed signal pedestal that is electrically coupled to the first and second pairs of feed signal output ports. A patch-type radiating element is also provided, which is electrically coupled by the feed signal pedestal to the first and second pairs of feed signal output ports.

In some of these embodiments of the invention, the patch-type radiating element is capacitively coupled to first and second pairs of feed signal lines on the feed signal pedestal, which are directly connected to the first and second pairs of feed signal output ports. The first and second pairs of feed signal lines on the feed signal pedestal may be solder-bonded to the first and second pairs of feed signal output ports.

A ring-shaped support frame may also be provided, which extends between the patch-type radiating element and the cross-polarized feed signal network. This ring-shaped support frame may be configured to define an at least partially electromagnetically-shielded cavity that surrounds at least a portion of the feed signal pedestal. In particular, the ring-shaped support frame may include at least one of a metallized interior surface facing the feed signal pedestal and a metallized exterior surface. The cross-polarized feed signal network may also include a printed circuit board having a ground plane thereon that contacts a metallized portion of the ring-shaped support frame.

According to additional embodiments of the invention, the feed signal pedestal includes an annular-shaped polymer having a cylindrically-shaped cavity therein, and the first and second pairs of feed signal lines extend along an exterior of the annular-shaped polymer. These first and second pairs of feed signal lines may extend parallel to a longitudinal axis of the cylindrically-shaped cavity within the feed signal pedestal.

According to further embodiments of the invention, an antenna is provided, which includes a cross-polarized feed signal network configured to convert first and second radio frequency (RF) input feed signals to first and second pairs of cross-polarized feed signals at respective first and second pairs of feed signal output ports. A polymer patch carrier is also provided, which includes a patch-type radiating element on an exterior surface thereof. This patch-type radiating element may be capacitively coupled to the first and second pairs of feed signal output ports. For example, the patch carrier may include the first and second pairs of feed signal lines, and the patch-type radiating element may be capacitively coupled to arcuate-shaped distal ends of the first and second pairs of feed signal lines. A rectangular, ring-shaped, support frame may also be provided, which extends between the patch carrier and the cross-polarized feed signal network.

In still further embodiments of the invention, an antenna is provided, which includes a feed signal network, and a patch carrier having a patch-type radiating element thereon, and a feed signal pedestal. The feed signal pedestal includes first and second pairs of feed signal lines thereon, which are coupled to the patch-type radiating element and extend at least partially through an electromagnetically-shielded cavity to the feed signal network. In some of these embodiments, the patch-type radiating element extends on an exterior surface of the patch carrier, and the feed signal pedestal includes an annular-shaped polymer having a cylindrically-shaped cavity therein. The first and second pairs of feed signal lines may be solder-bonded to the feed signal network and capacitively coupled to the patch-type radiating element. Moreover, in the event the feed signal network includes a printed circuit board having a ground plane thereon, then the first and second pairs of feed signal lines may be solder-bonded to portions of the feed signal network extending within openings in the ground plane. Advantageously, the patch carrier may also include a dielectric loading extension, which extends into the electromagnetically-shielded cavity. Among other things, this dielectric loading extension can be configured to tune a center frequency of the patch-type radiating element. The feed signal pedestal may extend through an opening in the dielectric loading extension.

In addition, a ring-shaped support frame may be provided, which extends between the patch carrier and the feed signal network. This support frame may include at least one of a metallized interior surface facing the feed signal pedestal and a metallized exterior surface. In some embodiments of the invention, a height of the ring-shaped support frame may be in a range from about 0.5 times to about 1.2 times a maximum height of the electromagnetically-shielded cavity relative to the feed signal network.

According to additional embodiments of the invention, an antenna is provided, which includes: (i) a cross-polarized feed signal network, (ii) a polymer-based patch carrier having a dielectric constant equal to about 3.8 or greater at a frequency of 3 GHz, and (iii) a patch-type radiating element, which extends on the patch carrier and is electrically coupled through an electromagnetically-shielded cavity to the cross-polarized feed signal network. A polymer patch carrier support frame may also be provided, which extends between the cross-polarized feed signal network and the patch carrier. The patch carrier support frame can be ring-shaped, and at least a portion of an inner sidewall of the patch carrier support frame and/or at least a portion of an outer sidewall of the patch carrier support frame may be metallized. In addition, a portion of the patch carrier may extend into the electromagnetically-shielded cavity to thereby operate as a dielectric load on the patch-type radiating element, which can support frequency tuning.

In further embodiments of the invention, an antenna is provided with a feed signal network, and an at least partially metallized support frame is provided on the feed signal network. A patch carrier having a patch-type radiating element thereon is also provided. This radiating element is electrically coupled through a cavity in the support frame to the feed signal network. The patch carrier may contact the support frame along an entire periphery of the support frame. An interface between the patch carrier and the support frame may extend in a first plane, and the patch carrier may advantageously include a dielectric loading extension, which extends through the first plane and into the cavity to thereby support frequency tuning of the patch-type radiating element. The patch carrier may also include a feed signal pedestal, which extends entirely through the cavity and is solder bonded to portions of the feed signal network. The patch carrier, including the feed signal pedestal and the dielectric loading extension, and the support frame may be configured as metallized polymers (e.g., metallized nylon).

According to still further embodiments of the invention, a patch-type antenna array is provided, which includes: (i) a feed signal network, (ii) a multi-chambered support frame on the feed signal network, and (iii) a patch carrier having a plurality of patch-type radiating elements thereon, which are electrically coupled through respective chambers in the multi-chambered support frame to the feed signal network. In some of these embodiments of the invention, the multi-chambered support frame may include a metallized polymer having a plurality of electromagnetically-shielded cavities within the chambers (e.g., with metallized interior sidewalls). In addition, a pitch between the plurality of patch-type radiating elements may be in a range from about 0.43λ to about 0.47λ, a stack height of the patch carrier and the multi-chambered support frame may be in a range from about 0.12λ to about 0.16λ, and a diameter of the plurality of patch-type radiating elements may be in a range from about 0.23λ to about 0.27λ, where λ corresponds to a wavelength (in air) of a radio frequency (RF) signal having a frequency of 3.55 GHz.

Antenna arrays according to further embodiments of the invention may include a polymer-based radiating element having an annular-shaped metallized radiating surface thereon, which is electrically coupled to a cross-polarized feed signal network. This polymer-based radiating element may include an annular-shaped polymer as a supporting substrate upon which the annular-shaped metallized radiating surface is provided.

The annular-shaped metallized radiating surface may be capacitively and inductively coupled to four polymer posts within the cross-polarized feed signal network, which have electrically conductive cores. These electrically conductive cores are configured to transfer respective ones of a plurality of feed signals generated by the cross-polarized feed signal network to the annular-shaped metallized radiating surface. Advantageously, the inclusion of an annular-shaped (i.e., circular ring-shaped) metallized radiating surface may support a reduction in the size of the radiating surface relative to conventional circular and rectangular patch-type radiating surfaces, and the reactive (C and L) coupling provided by the four polymer posts may support improvements in antenna bandwidth.

According to further embodiments of the invention, a cross-shaped metal radiating extension may be provided, which is electrically coupled at four distal ends thereof to an interior perimeter of the annular-shaped metallized radiating surface. In addition, the electrically conductive cores within the four polymer posts may be capacitively coupled to a corresponding one of the four distal ends of the cross-shaped metal radiating extension. A first pair of collinear and metallized extension strips may also be provided, which extend radially outward from an exterior perimeter of the annular-shaped metallized radiating surface. Likewise, a second pair of collinear and metallized extension strips may be provided, which extend radially outward from the exterior perimeter of the annular-shaped metallized radiating surface. Preferably, the first pair of collinear and metallized extension strips are aligned with a first radiating extension within the cross-shaped metal radiating extension, and the second pair of collinear and metallized extension strips are aligned with a second radiating extension within the cross-shaped metal radiating extension, which extends orthogonally relative to the first radiating extension. Although not wishing to be bound by any theory, these strips may be utilized to support further size reduction in the annular-shaped supporting substrate and impedance matching at lower end resonant frequency operation. In addition, by controlling the width and length of the strips, better impedance matching can be achieved.

According to still further embodiments of the invention, a polymer-based radiating extension support may be provided, upon which the cross-shaped metal radiating extension extends. This polymer-based radiating extension support may be cross-shaped and fully aligned with the cross-shaped metal radiation extension. However, in some alternative embodiments of the invention, the annular-shaped polymer supporting substrate of the radiating element and the polymer-based radiating extension support may be collectively configured as a unitary disc-shaped polymer body.

According to still further embodiments of the invention, the annular-shaped polymer supporting substrate of the radiating element, the polymer-based radiating extension support and the four polymer posts may be advantageously configured as a unitary polymer structure. The cross-polarized feed signal network may also include a planar support base through which the electrically conductive cores within the four polymer posts extend. And, in these embodiments of the invention, the planar support base, the polymer-based radiating element and the four polymer posts may be configured as a three-dimensional (3D) unitary polymer structure.

In further embodiments of the invention, an isolation wall may be provided, which extends on the planar support base and surrounds the four polymer posts. This isolation wall may be configured to facilitate electromagnetic isolation (using metallized interior sidewalls), impedance matching and antenna pattern optimization. A ground-plane antenna reflector may also be provided, which includes an opening therein through which the isolation wall and the polymer posts extend. In these embodiments of the invention, the planar support base may contact a rear surface of the reflector when the antenna is fully assembled.

According to additional embodiments of the invention, an antenna is provided, which includes a first polymer-based radiating element having a first annular-shaped metallized radiating surface thereon and a second polymer-based radiating element having a second annular-shaped metallized radiating surface thereon. The first metallized radiating surface is electrically coupled to a first portion of a cross-polarized feed signal network and the second metallized radiating surface is electrically coupled to a second portion of a cross-polarized feed signal network. This cross-polarized feed signal network further includes: (i) a first plurality of polymer posts having electrically conductive cores that are capacitively and inductively coupled to the first annular-shaped metallized radiating surface, and (ii) a second plurality of polymer posts having electrically conductive cores capacitively and inductively coupled to the second annular-shaped metallized radiating surface. The cross-polarized feed signal network may also include a planar support base through which the electrically conductive cores within the first and second plurality of polymer posts extend. Advantageously, the planar support base, the first and second pluralities of polymer posts and the first and second polymer-based radiating elements may be collectively configured as a fully integrated and 3D unitary polymer structure. First and second isolation walls may also be provided on the planar support base, and may surround the first and second pluralities of polymer posts, respectively.

DETAILED DESCRIPTION OF EMBODIMENTS

Figure 1A:
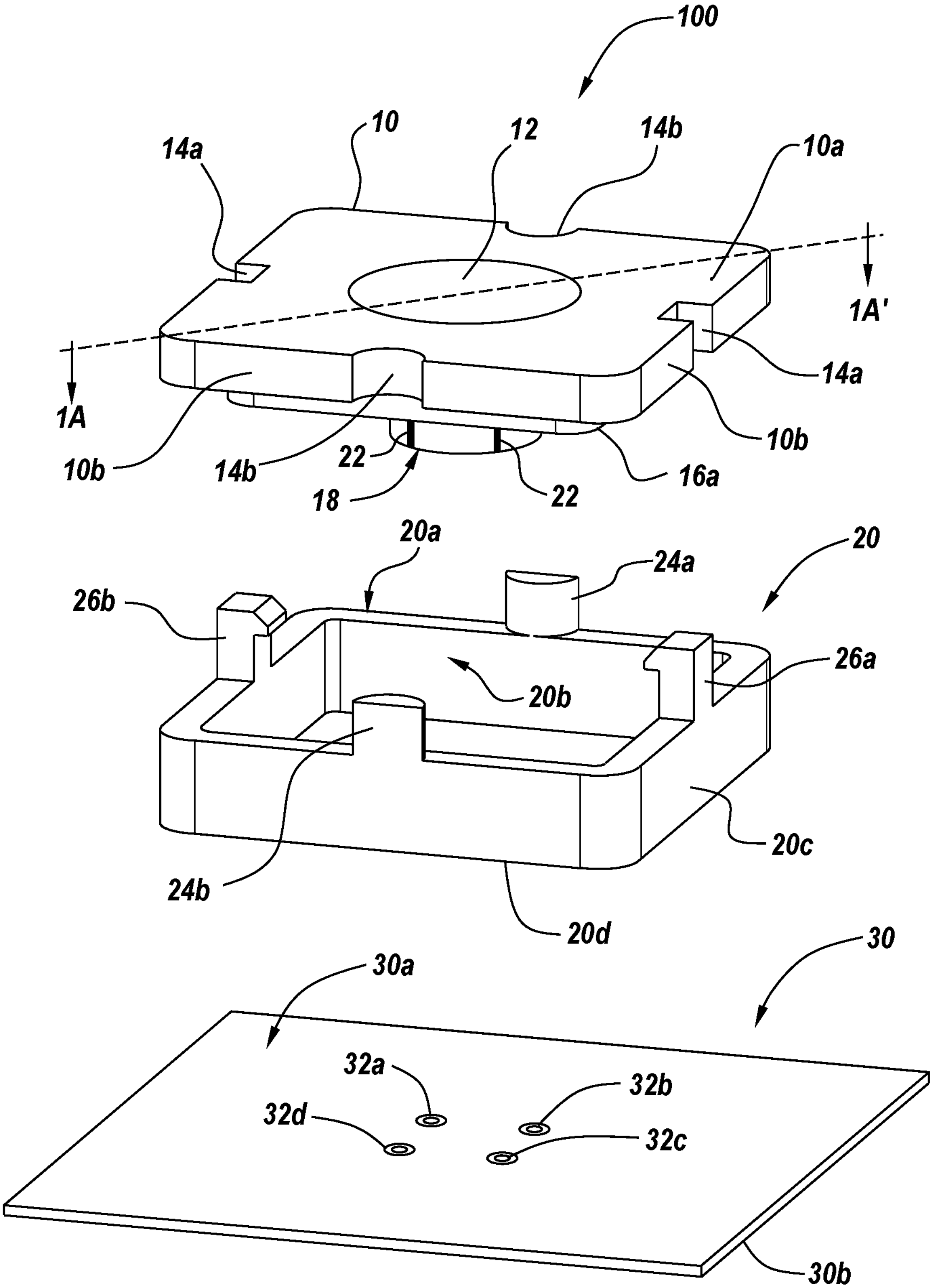
FIG. 1A is an exploded view from a side perspective of a three-piece patch-type radiating element, which includes a feed signal network, a support frame and a patch carrier (with patch) according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
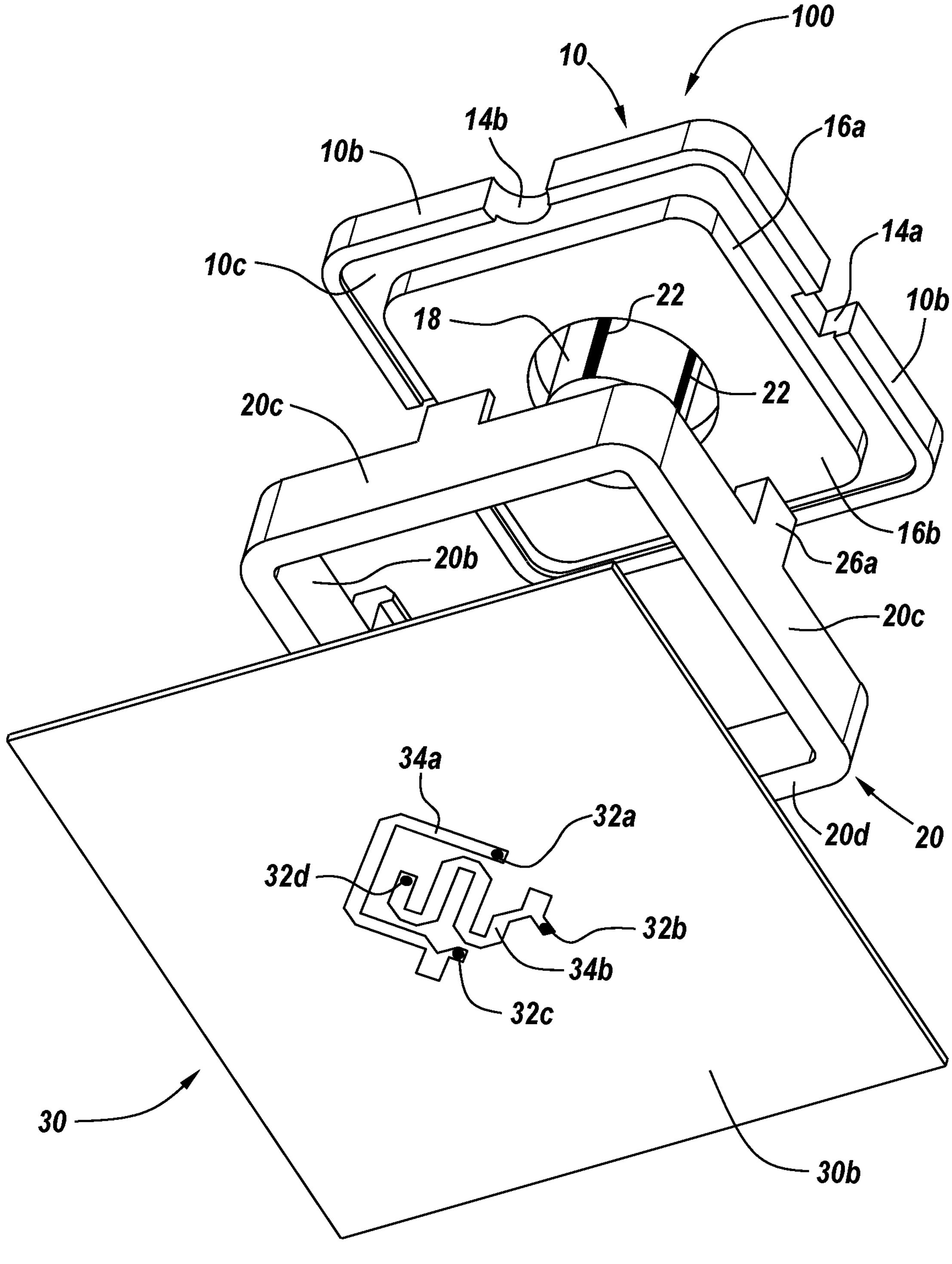
FIG. 1B is an exploded view from a rear perspective of the three-piece patch-type radiating element of FIG. 1A, according to an embodiment of the invention.
Figure 1C:
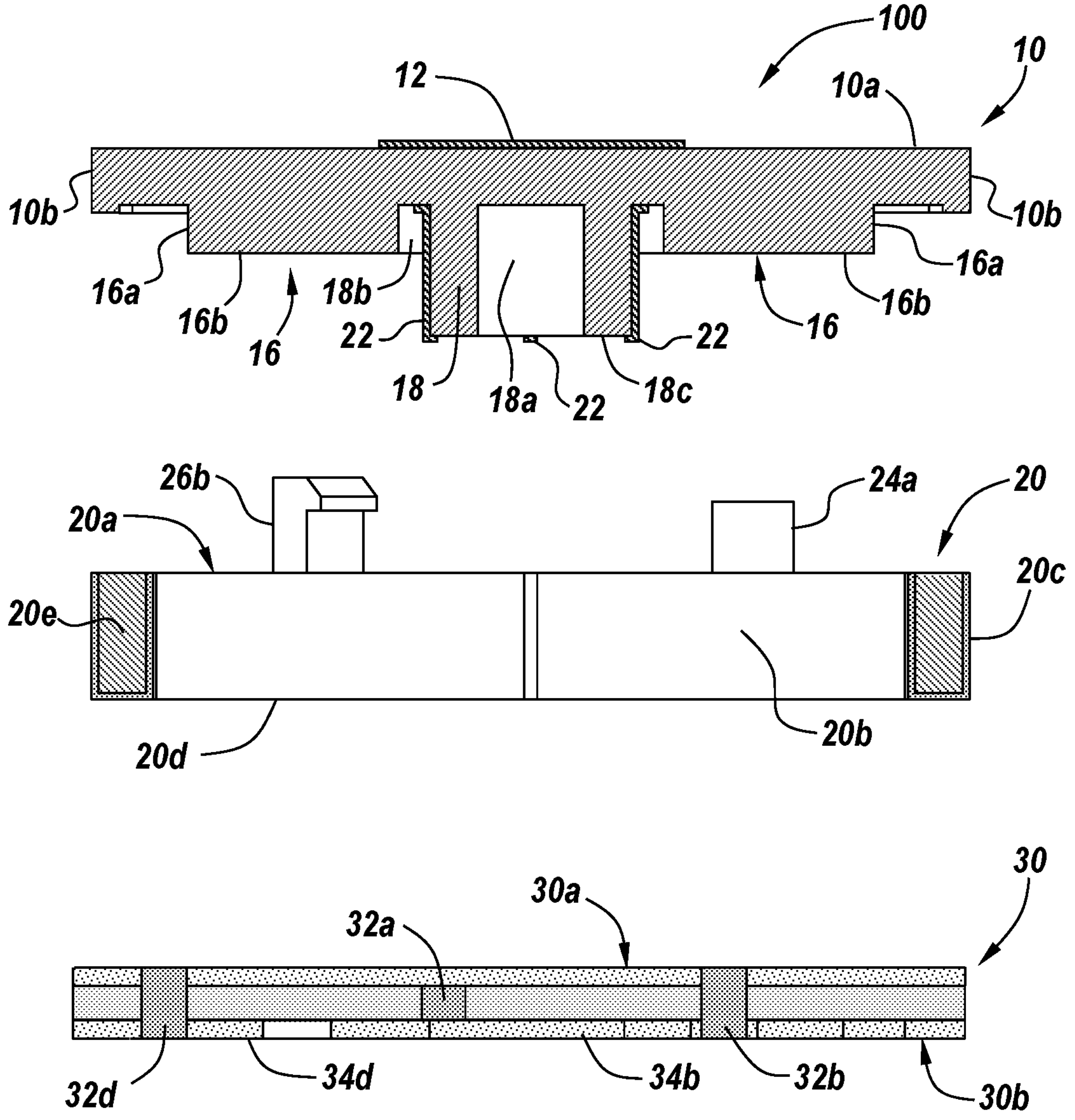
FIG. 1C is a side cross-sectional view of the three-piece patch-type radiating element of FIG. 1A, taken along a plane 1A-1A', according to an embodiment of the invention.

Referring now to FIGS. 1A-1C, a three-piece patch-type radiating element 100 is illustrated as including a feed signal network 30 and a rectangular-shaped polymer support frame 20 having a rear facing and preferably metallized surface 20*d*, which is disposed on the feed signal network 30. This feed signal network 30 may be provided by a dual-sided printed circuit board (PCB), which includes: (i) a mostly metallized forward-facing surface 30*a* (e.g., GND plane) configured to contact the metallized rear facing surface 20*d* of the support frame 20, and (ii) a rear-facing surface 30*b*, which includes a pair of patterned metal traces 34*a*, 34*b* thereon. As shown, the first metal trace 34*a* is electrically coupled at first and second ends thereof to a first pair of plated through-holes 32*a*, 32*c*, whereas the second metal trace 34*b* is electrically coupled at first and second ends thereof to a second pair of plated through-holes 32*b*, 32*d*. These plated through-holes 32*a*-32*d* can be hollow or completely filled through-holes, so long as the inner sidewalls of the holes 32*a*-32*d* are sufficiently plated with a conductive skin. Nonetheless, for higher power applications, it may be advantageous to fill the through-holes to achieve better heat sink performance and/or mechanical strength. In addition, the rear facing surface 30*d* of the support frame 20 may be fixedly attached (e.g., screwed) to the forward facing surface 30*a* of the feed signal network 30, and the contact area therebetween and contact force may be advantageously controlled to inhibit passive intermodulation (PIM) distortion. Alternatively, membranes (not shown) may be utilized between the forward facing surface 30*a* and the support frame 20 to support capacitive coupling therebetween. And, in further embodiments of the invention, the support frame 20 can undergo a reflow process to thereby become a surface mount (SMT) device on the forward facing surface 30*a*.

A rectangular-shaped polymer patch carrier 10 is also provided, which can be partially received within and fixedly attached to the support frame 20 using alignment guides/posts 24*a*, 24*b* and snap-type clips 26*a*, 26*b* that extend into recesses 14*a*, 14*b* in the patch carrier 10 when the radiating element 100 is fully assembled. As shown, a circular metal patch 12 for radiating/receiving radio frequency (RF) signals is provided on an upper surface 10*a* of the patch carrier 10. In addition, the outer length and width dimensions of the patch carrier 10 may be sufficiently equivalent to the corresponding length and width dimensions of the support frame 20, so that: (i) the outer sidewalls 10*b* of the patch carrier 10 are generally aligned to the outer, and preferably metallized, sidewalls 20*c* of the support frame 20, and (ii) an underside ring-shaped rim 10*c* of the patch carrier 10 contacts a corresponding forward-facing and ring-shaped surface 20*a* of the support frame 20. As illustrated, neither the forward-facing and ring-shaped surface 20*a* of the support frame 20 nor the underside ring-shaped rim 10*c* of the patch carrier 10 must be metallized. However, the support frame 20 may include a metallized external sidewall 20*c* and a metallized internal sidewall 20*b*, which cover a polymer (e.g., nylon) core 20*e*. Nonetheless, the support frame 20 may be fully metallized to reduce costs and preclude the core material of the support frame 20 from materially influencing the performance characteristics of the patch-type radiating element 100.

Referring still to FIGS. 1A-1C and FIG. 3, the patch carrier 10 may include an annular-shaped feed signal pedestal 18, and a dielectric loading extension 16. This dielectric loading extension 16 is defined by an outermost sidewall 16*a* (e.g., rectangular-shaped) and has a predetermined thickness (DL) defined by a rear-facing surface 16*b*, which is exposed to an interior "electromagnetically-shielded" cavity within the rectangular support frame 20. Moreover, because the space between the metal patch 12 and the ground (GND) plane 30*a* is the space where the electromagnetic (EM) power is greatest, the air in the cavity 40 and the dielectric material (e.g., nylon) within the patch carrier 10 represent the only two materials extending between the patch 12 and the ground plane 30*a*. Accordingly, the predetermined thickness DL of the dielectric loading extension 16 may be adjusted to thereby "tune" the equivalent dielectric constant (DK) of the full space (including air) between the patch 12 and the ground plane 30*a*, but without using higher DK materials which may cause a reduction in bandwidth.

Figure 2:
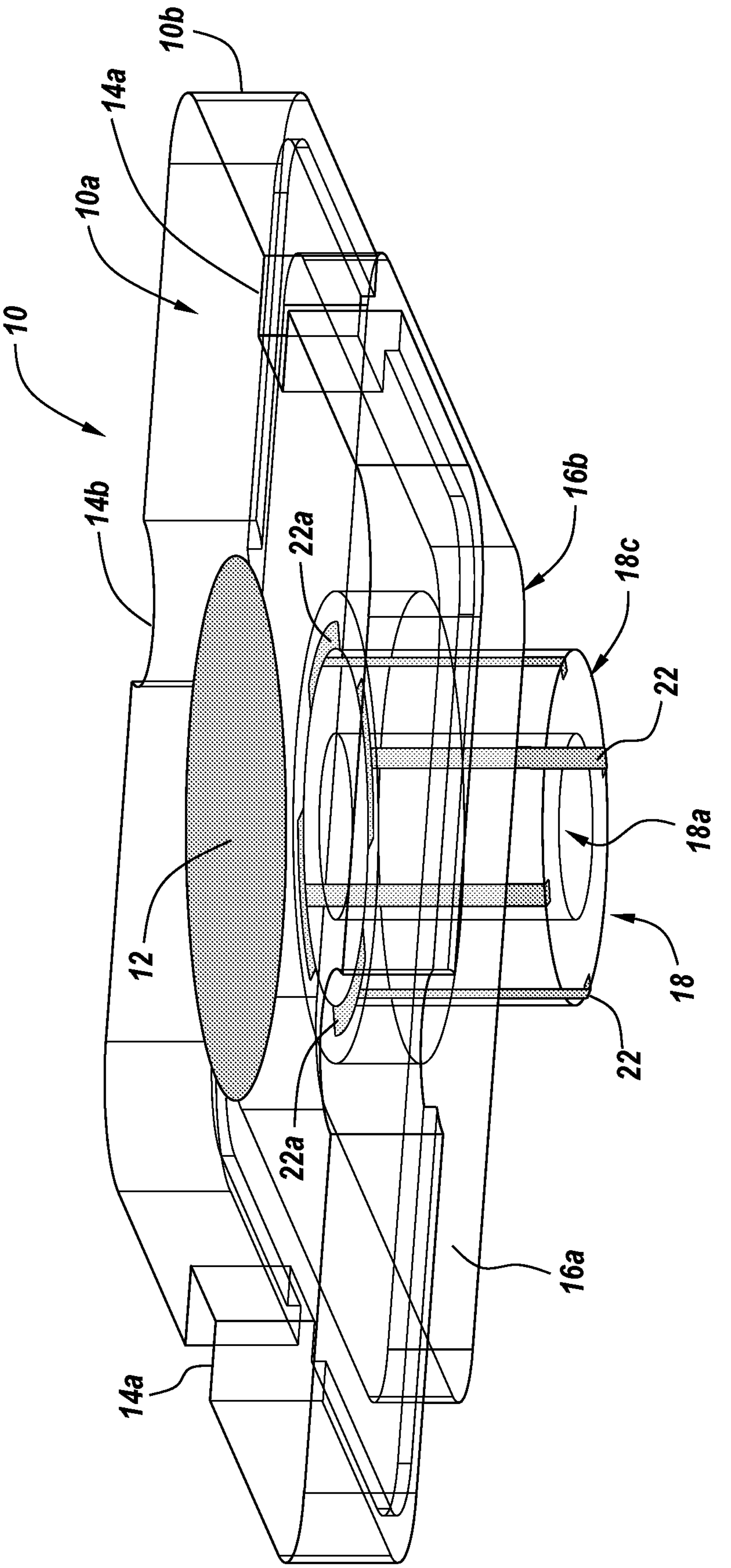
FIG. 2 is a perspective view of the patch carrier (with patch) of FIGS. 1A-1C, according to an embodiment of the invention.
Figure 3:
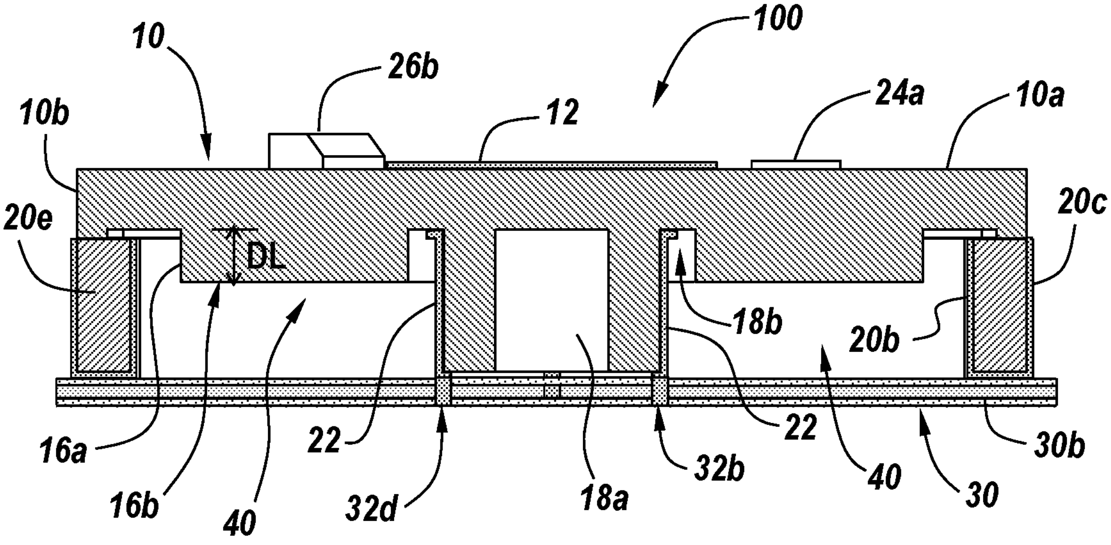
FIG. 3 is a cross-sectional side view of the three-piece patch-type radiating element of FIGS. 1A-1C, as assembled, according to an embodiment of the invention.
Figure 5:
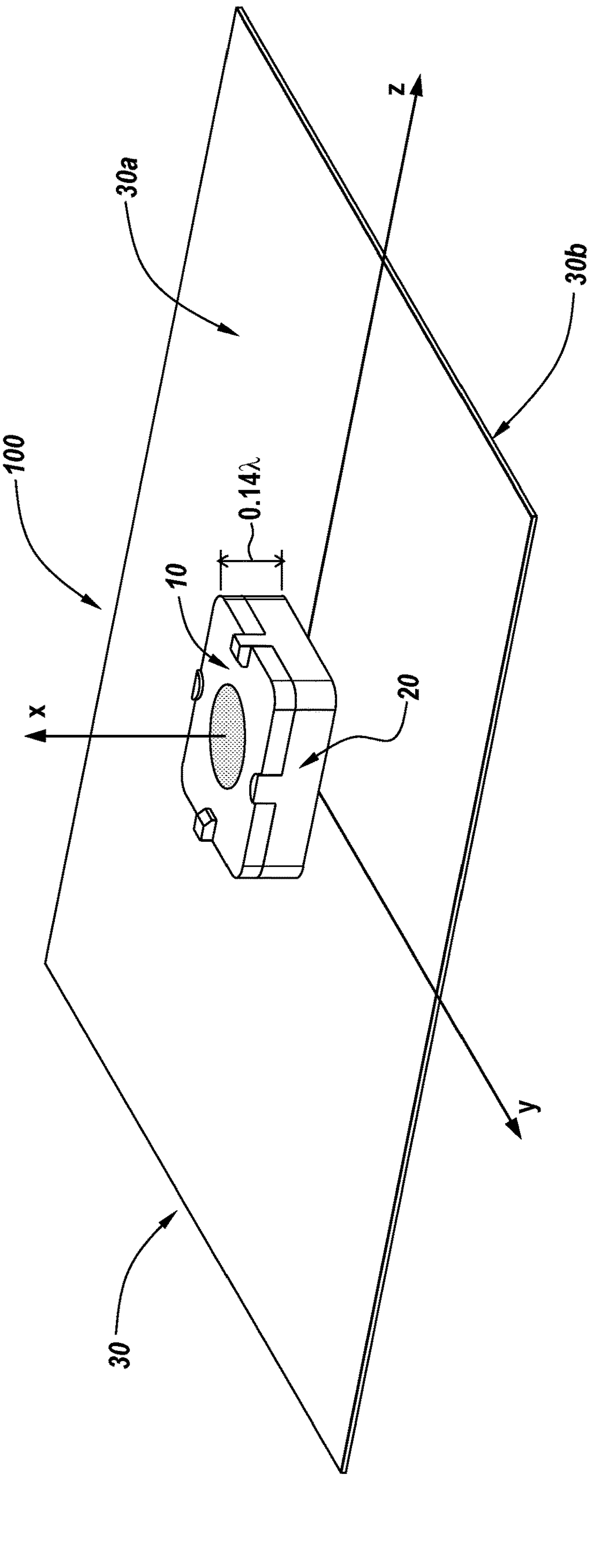
FIG. 5 is a perspective view of the three-piece patch-type radiating element of FIGS. 1A-1C, 2, 3 and 4A-4B, as assembled, where the x-z directions designate the elevation plane and the x-y directions designate the azimuth plane.

These aspects of FIGS. 1A-1C are further illustrated by the patch carrier 10 of FIG. 2 and the cross-section of the fully assembled patch-type radiating element 100 of FIG. 3, which shows the interior "electromagnetically-shielded" cavity 40 within the metallized support frame 20. In addition, FIG. 5 illustrates a perspective view of a fully assembled patch-type radiating element 100 having a stack height of 0.14λ, and metal patch diameter of 0.25λ, where λ represents the wavelength (in air) at $f_0$ (i.e., a center frequency of an operation band, such as 3.55 GHz). The polymer materials within the patch carrier 10 and support frame 20 may also be selected to have a dielectric constant of about 3.8 or greater (e.g., at a frequency of 3 GHz), such as a polyamide material (e.g., nylon).

The annular-shaped feed signal pedestal 18 is illustrated as including a cylindrically-shaped cavity/recess 18*a* therein, which has a longitudinal axis that is aligned to a center of the circular metal patch 12. In addition, a surrounding annular-shaped recess 18*b* may be provided, which extends between an inner sidewall of the dielectric loading extension 16 and an external sidewall of the feed signal pedestal 18. As shown, this external sidewall of the feed signal pedestal 18 may support two pairs of feed signal lines 22 thereon. These feed signal lines 22 extend the full height of the feed signal pedestal 18 and wrap onto a rear-facing surface 18*c* thereof, where they are solder bonded to corresponding ones of the through-holes 32*a*-32*d* within the feed signal network 30. The feed signal lines 22 also include arcuate-shaped distal ends 22*a*, which extend opposite respective portions of the circular patch 12 so that capacitive coupling is provided between each of the arcuate-shaped distal ends 22*a* of the signal lines 22 and the patch 12. As will be understood by those skilled in the art, the amount of capacitive coupling between the arcuate-shaped distal ends 22*a* of the feed signal lines 22 and the patch 12 is a function of: (i) the thickness and dielectric constant of the patch carrier material (e.g., nylon) extending between the arcuate-shaped distal ends 22*a* and the patch 12, and (ii) the area of overlap between the arcuate-shaped distal ends 22*a* and the patch 12.

Figure 4A:
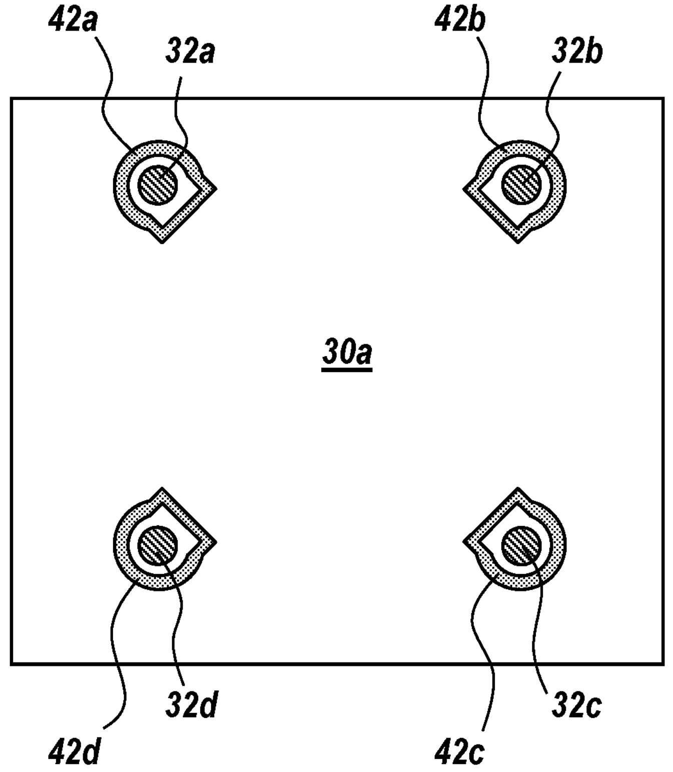
FIG. 4A is a front plan view of a portion of the feed signal network of FIGS. 1A-1C, according to an embodiment of the invention.
Figure 4B:
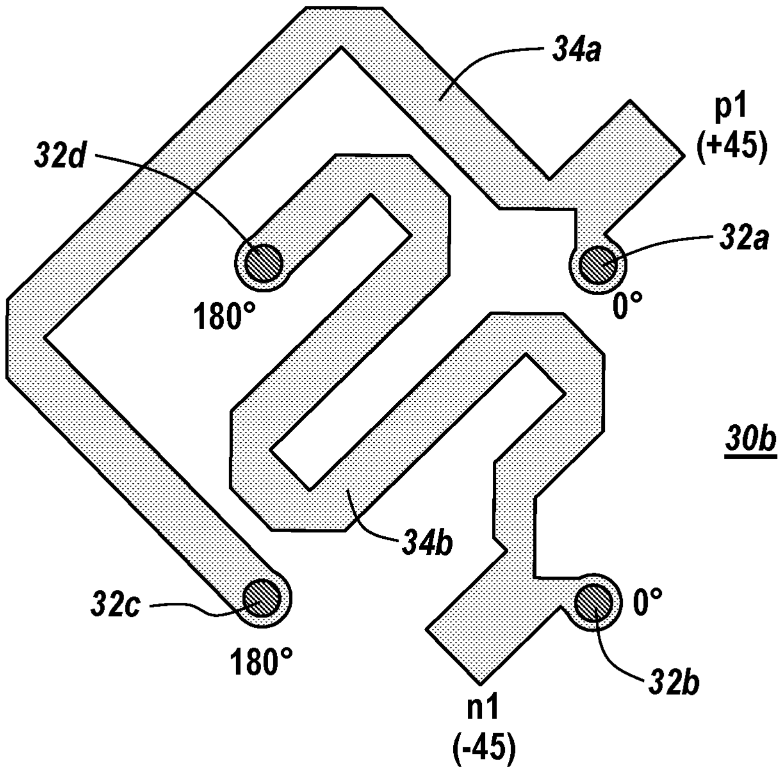
FIG. 4B is a rear plan view of a portion of the feed signal network of FIGS. 1A-1C, according to an embodiment of the invention.

Referring now to FIGS. 4A-4B, the mostly metallized forward-facing surface 30*a* of the feed signal network 30 includes a plurality of closed-loop electrical isolation regions 42*a*-42*d* (i.e., regions without metallization) surrounding respective ones of the electrically conductive through-holes 32*a*-32*d*. These through-holes extend through the PCB of the feed signal network 30 to the rear-facing surface 30*b*, which includes the first metal trace 34*a* and the second metal trace 34*b* thereon. As shown, these metal traces 34*a*, 34*b* are patterned to have respective lengths that support 0° and 180° phase delays (i.e., ½λ) to respective cross-polarized input feed signals (e.g., p1 (+45°), n1 (−45°).

Figure 6A:
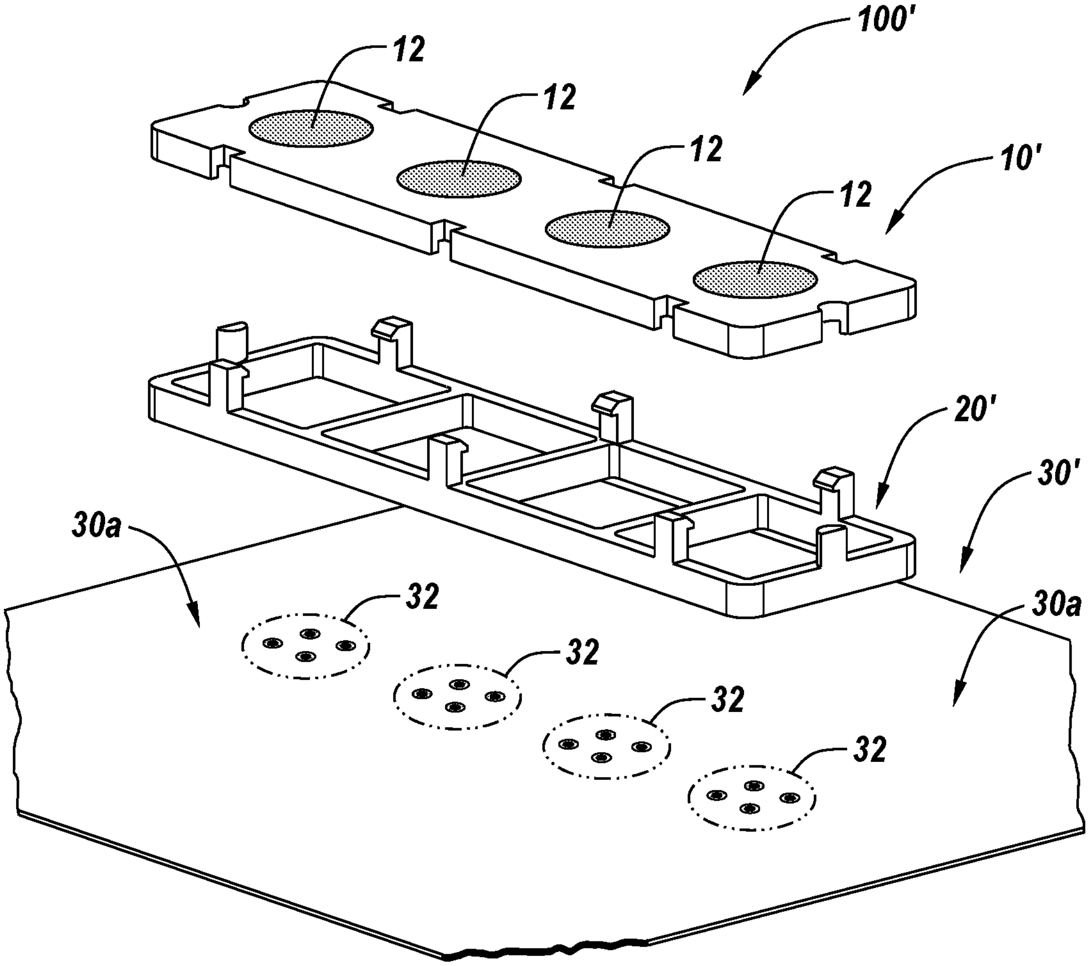
FIG. 6A is an exploded view from a side perspective of a three-piece patch-type antenna array, which includes a feed signal network, a multi-chambered support frame and a patch carrier (with a linear patch array thereon), according to an embodiment of the invention.
Figure 6B:
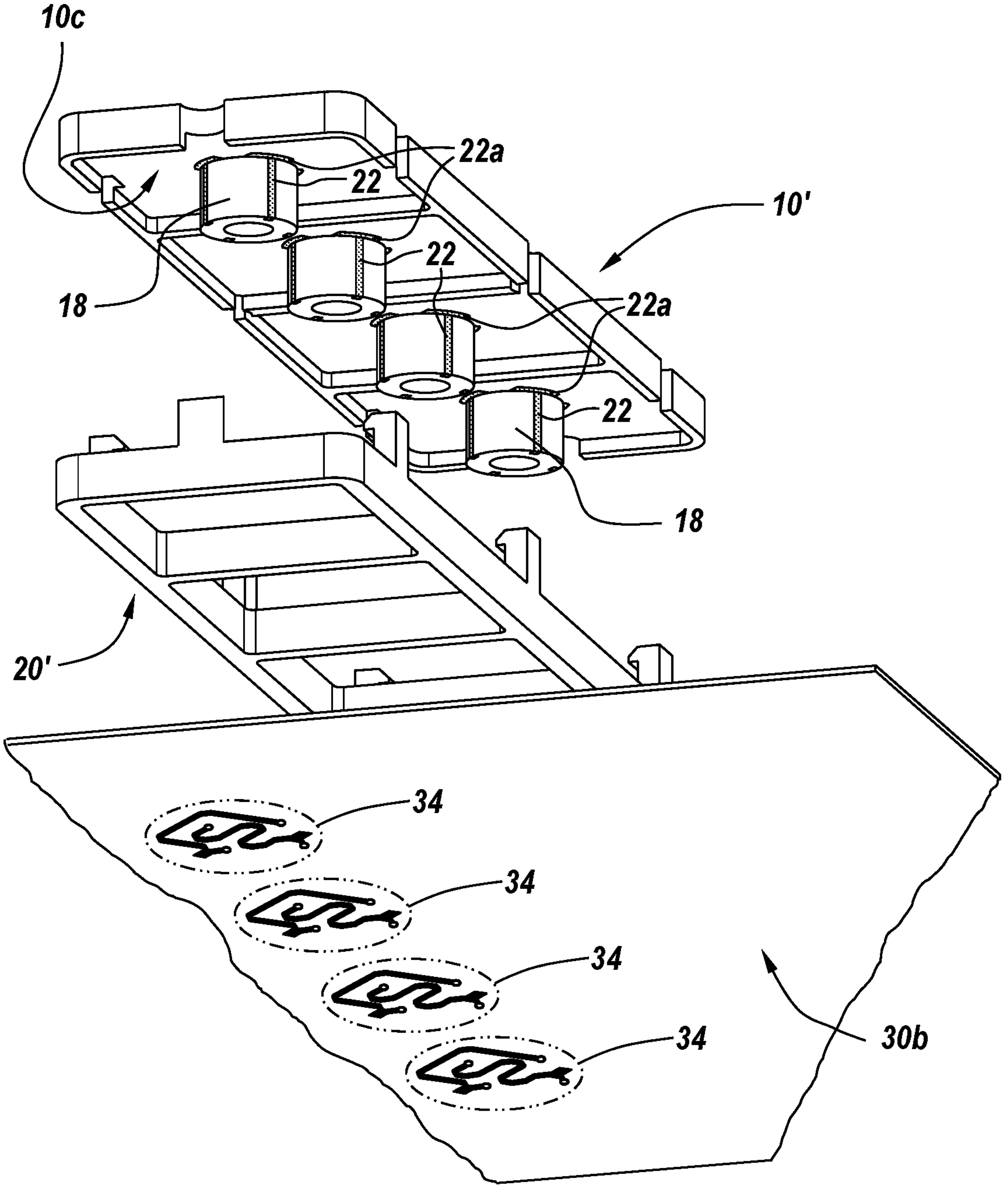
FIG. 6B is an exploded view from a rear perspective of the three-piece patch-type antenna array of FIG. 6A, according to an embodiment of the invention.
Figure 7:
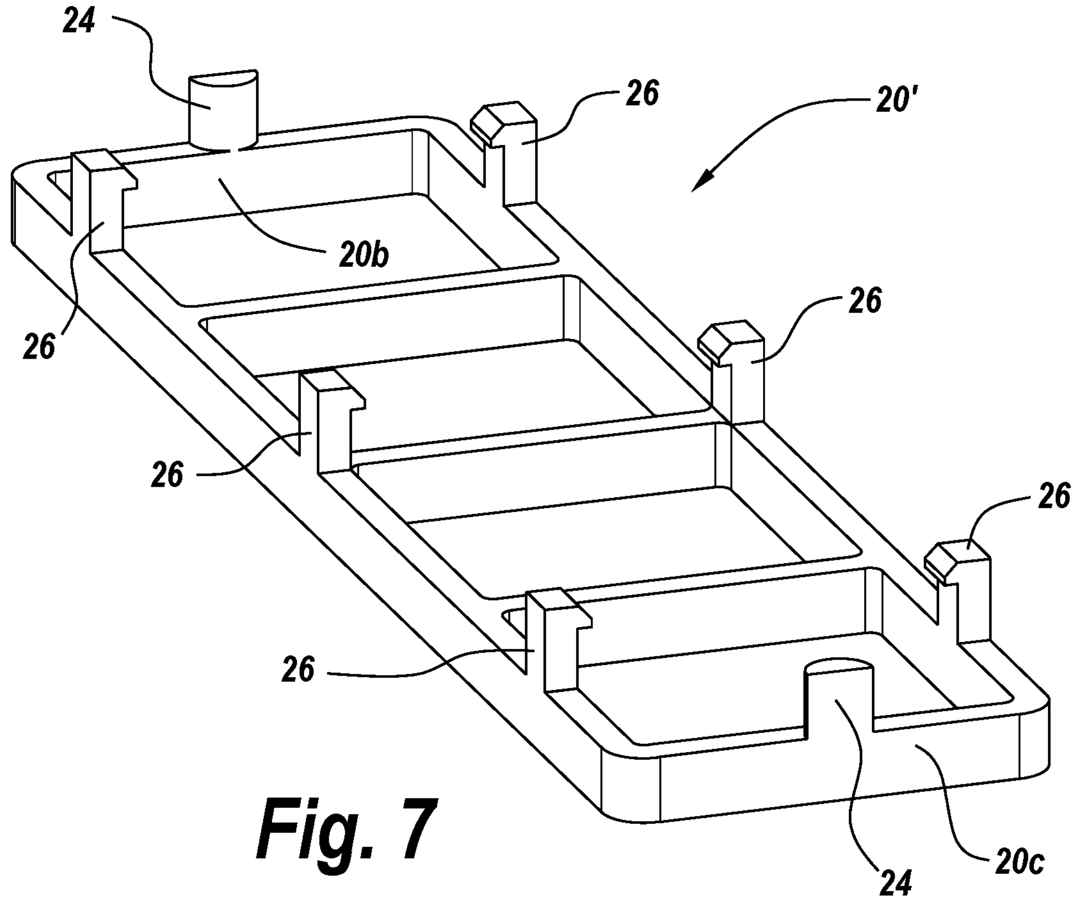
FIG. 7 is a perspective view of the multi-chambered support frame of FIGS. 6A-6B, according to an embodiment of the present invention.
Figure 8:
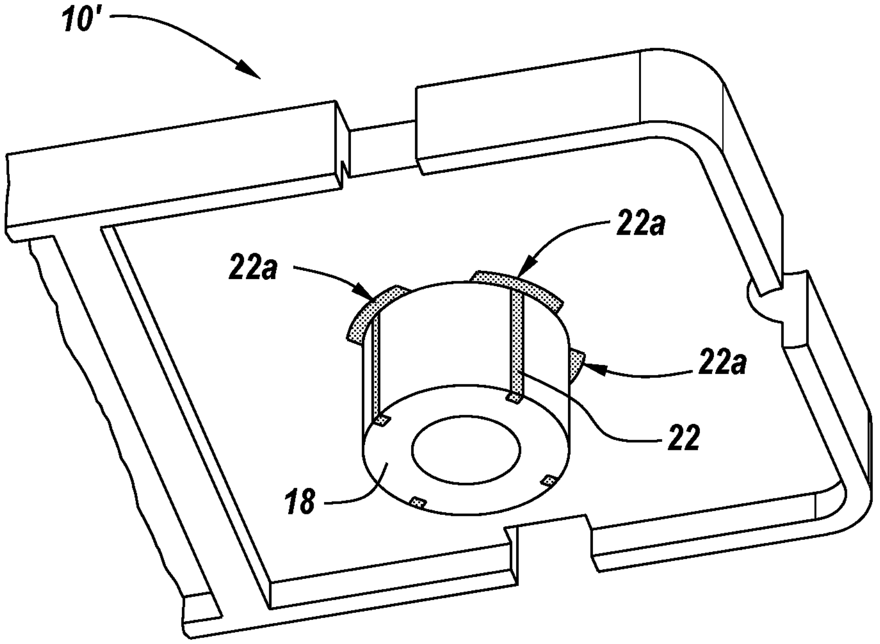
FIG. 8 is a rear perspective view of a portion of the patch carrier of FIGS. 6A-6B, according to an embodiment of the invention.

Referring now to the "exploded" side and rear perspective views of FIGS. 6A-6B and the perspective views of FIGS. 7-8, a linear patch-type antenna array 100' is illustrated as including a feed signal network 30', a multi-chambered support frame 20' with alignment posts 24 and clips 26, and an elongate patch carrier 10'. Advantageously, in some embodiments of the invention, this linear patch-type antenna array 100' may be utilized as a substitute for one or more cross-dipole radiating elements within a beam forming antenna, including the beam forming antennas disclosed in commonly assigned U.S. Provisional Application Ser. No. 62/779,468, filed Dec. 13, 2018, the disclosure of which is hereby incorporated herein by reference. In particular, the patch-type radiating elements described herein may be smaller than comparable cross-dipole radiating elements, may have broader beam width (which improves scanning), and may exhibit better impedance matching (and hence have a broader bandwidth). In addition, the use of a smaller number of metallized polymer (e.g., plastic) parts may provide significant cost and assembly advantages.

This patch carrier 10' includes a linear array of metal patches 12 on a forward-facing surface thereof and a corresponding linear array of feed signal pedestals 18 on an underside surface 10*c*. As highlighted by FIG. 8, four (4) feed signal lines 22, with arcuate-shaped distal ends 22*a*, are provided on each of the feed signal pedestals 18, as described hereinabove with respect to FIGS. 1C, 2 and 3.

As shown best by FIG. 6A, a forward-facing surface 30*a* of the feed signal network 30' is illustrated as including a plurality of groups of through-holes 32, which correspond to the through-holes 32*a*-32*d* of FIGS. 1A and 4A. And, as shown best by FIG. 6B, a rear-facing surface 30*b* of the feed signal network 30' is illustrated as including a plurality of groups of patterned metal traces 34, which correspond to the metal traces 34*a*-34*d* of FIGS. 1B and 4B. Thus, upon assembly of the elongate patch carrier 10' and the 4-chamber support frame 20' of FIG. 7 on the feed signal network 30', the feed signal lines 22 become electrically connected to corresponding ones of the metal traces 34*a*-34*d* within the respective groups of metal traces 34 on the rear-facing surface 30*b*.

Figure 9:
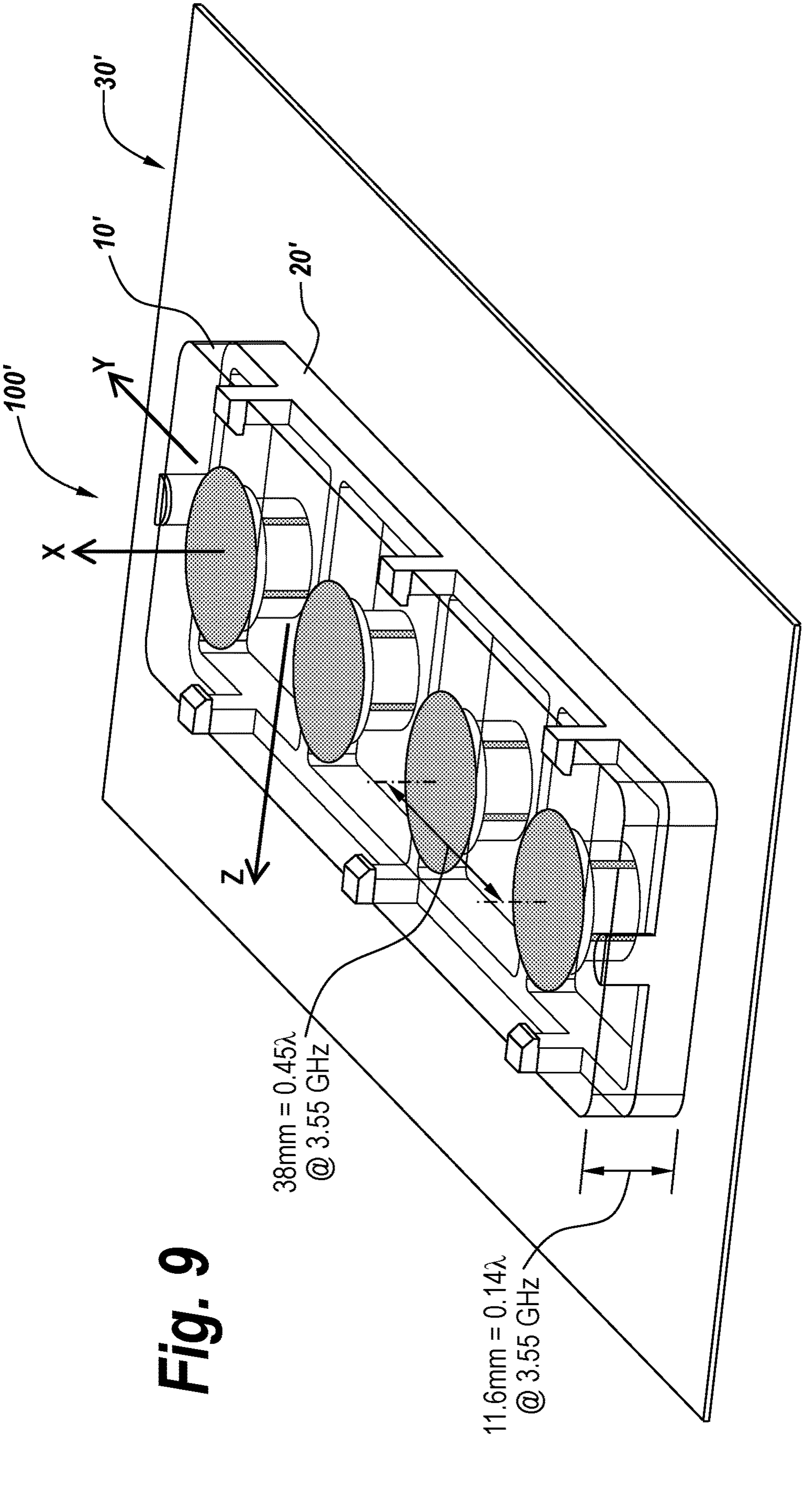
FIG. 9 is a perspective view of the three-piece patch-type antenna array of FIGS. 6A-6B, 7 and 8, as assembled, where the x-z directions designate the elevation plane and the x-y directions designate the azimuth plane.

Moreover, as shown by FIG. 9, an assembled patch antenna array 100' according to an embodiment of the invention may be configured so that: (i) a pitch between the plurality of metal patches 12 is less than 1.0λ, but more preferably in a range from about 0.43λ to about 0.47λ, (ii) a stack height of the patch carrier 10' and the multi-chambered support frame 20' is less than 0.25λ, but more preferably in a range from about 0.12λ to about 0.16λ, and (iii) a diameter of the plurality of metal patches 12 is less than 0.5λ, but more preferably in a range from about 0.23λ to about 0.27λ, where λ corresponds to a wavelength of a radio frequency (RF) signal (in air) having a frequency of 3.55 GHz.

Figure 10:
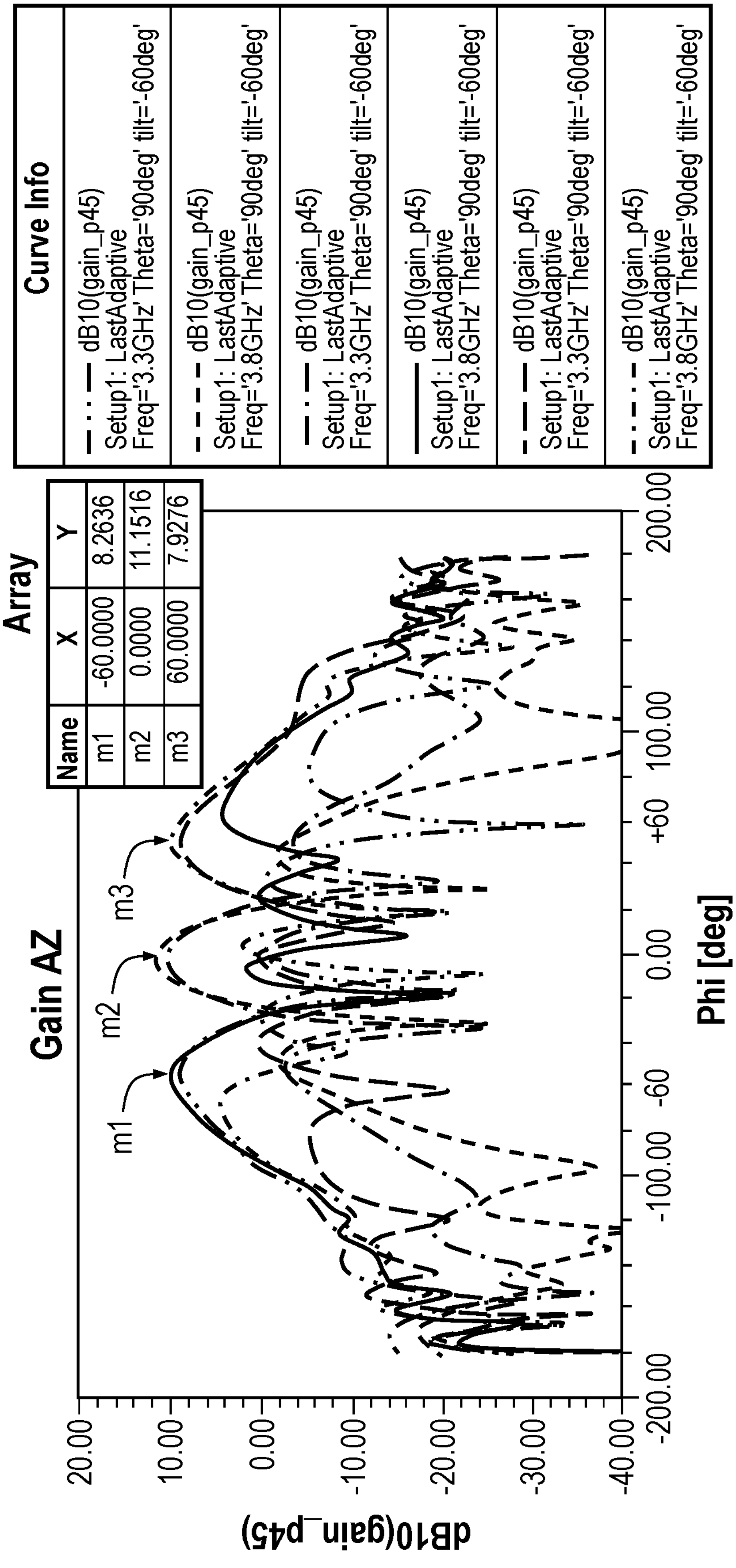
FIG. 10 is a graph of the gain pattern in the az-plane for the patch-type antenna array of FIG. 9 on a ground plane of $4.4\lambda \times 2.4\lambda$, which illustrates a peak-gain ranging from 7.9276 dB to 11.1516 dB (i.e., a $\Delta$Gain=3.224 dB), across an operation band of 3.3 GHz to 3.8 GHz, and over a full scan range from −60° to +60° in the az-plane.

Referring now to FIG. 10, a graph of the gain pattern in the az-plane for the patch-type antenna array 100' of FIG. 9 (on a ground plane 30*a* of 4.4λ×2.4λ) is provided, which illustrates a peak-gain ranging from 7.9276 dB to 11.1516 dB (i.e., a ΔGain=3.224 dB), across an operation band of 3.3 GHz to 3.8 GHz, and over a full scan range from −60° to +60° in the az-plane.

Figure 11A:
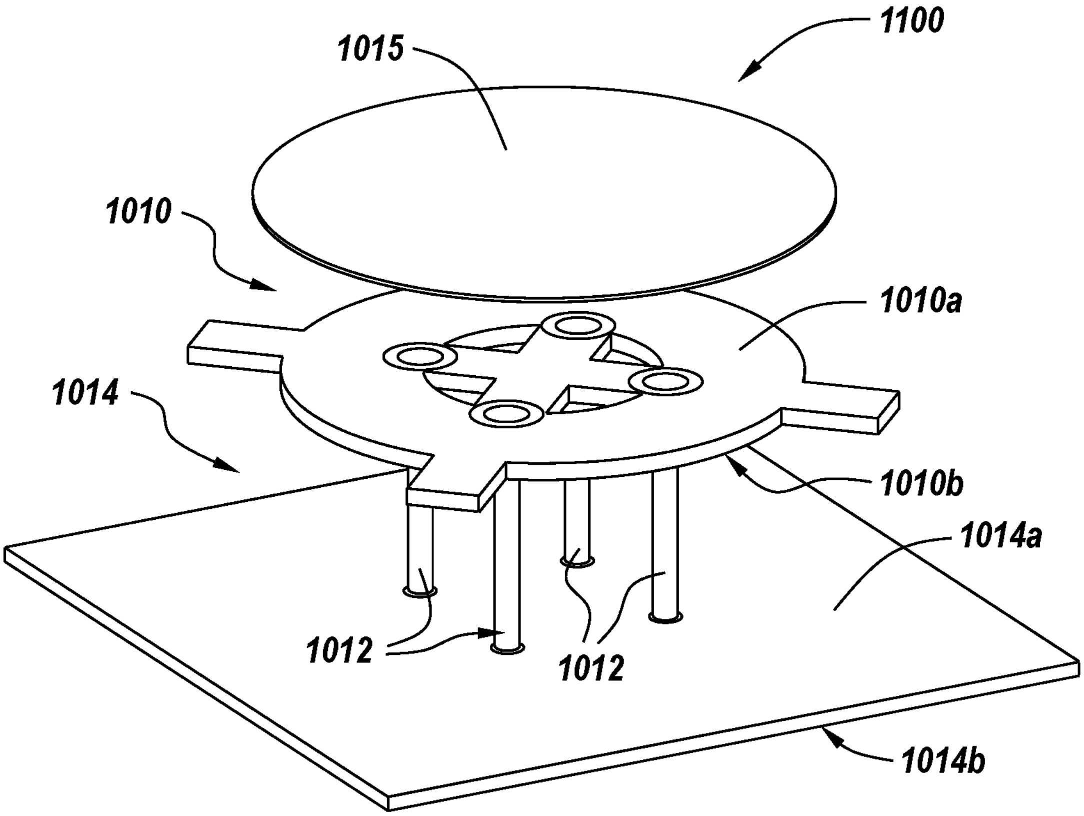
FIG. 11A is a perspective view of a polymer-based radiating element and cross-polarized feed signal network, according to an embodiment of the invention.
Figure 11B:
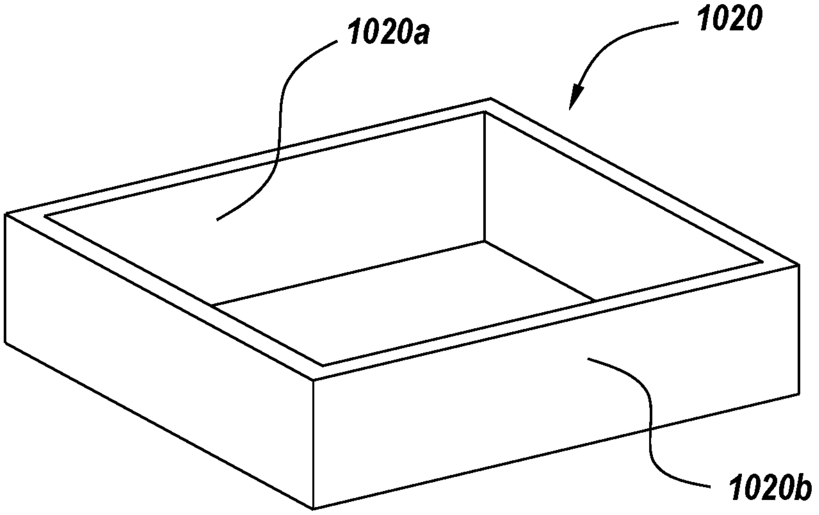
FIG. 11B is a perspective view of a four-sided isolation wall, according to an embodiment of the invention.
Figure 11C:
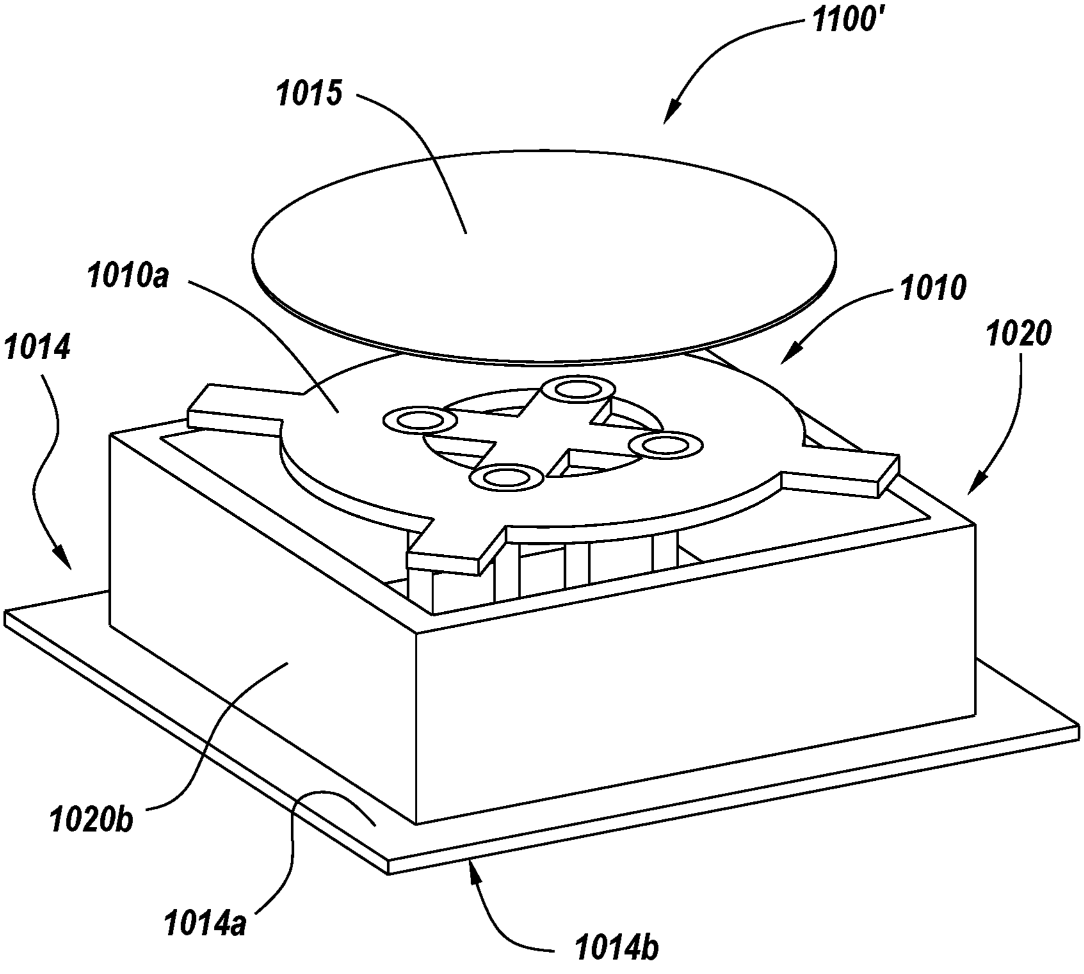
FIG. 11C is a perspective view of a fully assembled polymer-based radiating element with cross-polarized feed signal network and four-sided isolation wall, according to an embodiment of the invention.

Referring now to FIGS. 11A-11D, a polymer-based radiating element 1100 with cross-polarized feed signal network is illustrated as including an annular-shaped metallized radiating surface 1010*a* on an underlying annular-shaped polymer support 1010*b*, which operates as a supporting substrate. The metallized radiating surface 1010*a* is electrically coupled to an underlying cross-polarized feed signal network, which is illustrated as including four metallized polymer posts 1012, which operate as feed probes, and a planar support base 1014, which may have a metallized forward facing surface 1014*a*. Advantageously, the annular-shaped polymer support 1010*b*, the four polymer posts 1012 and the planar support base 1014 are configured as a three-dimensional (3D) unitary polymer (e.g., nylon) structure, such as a 3D injection-molded plastic structure. As shown by FIGS. 11B-11C, a four-sided isolation wall 1020 having an outer sidewall 1020*b* and a metallized inner sidewall 1020*a* may also be mounted onto the metallized surface 1014*a* of the planar support base 1014 to thereby yield a fully assembled and enclosed polymer-based radiating element 1100' containing an annular-shaped radio frequency (RF) radiator 1010 therein. An electrically conductive (e.g., metal) radio frequency (RF) director 1015 (optional) may also be provided at a fixed distance relative to the metallized radiating surface 1010*a*, using a separate support with snap-in feature (not shown) to the annular-shaped polymer support 1010*b*. In some embodiments of the invention, it may be advantageous if the outer sidewall 1020*b* of the isolation wall 1020 is not metallized.

Figure 11D:
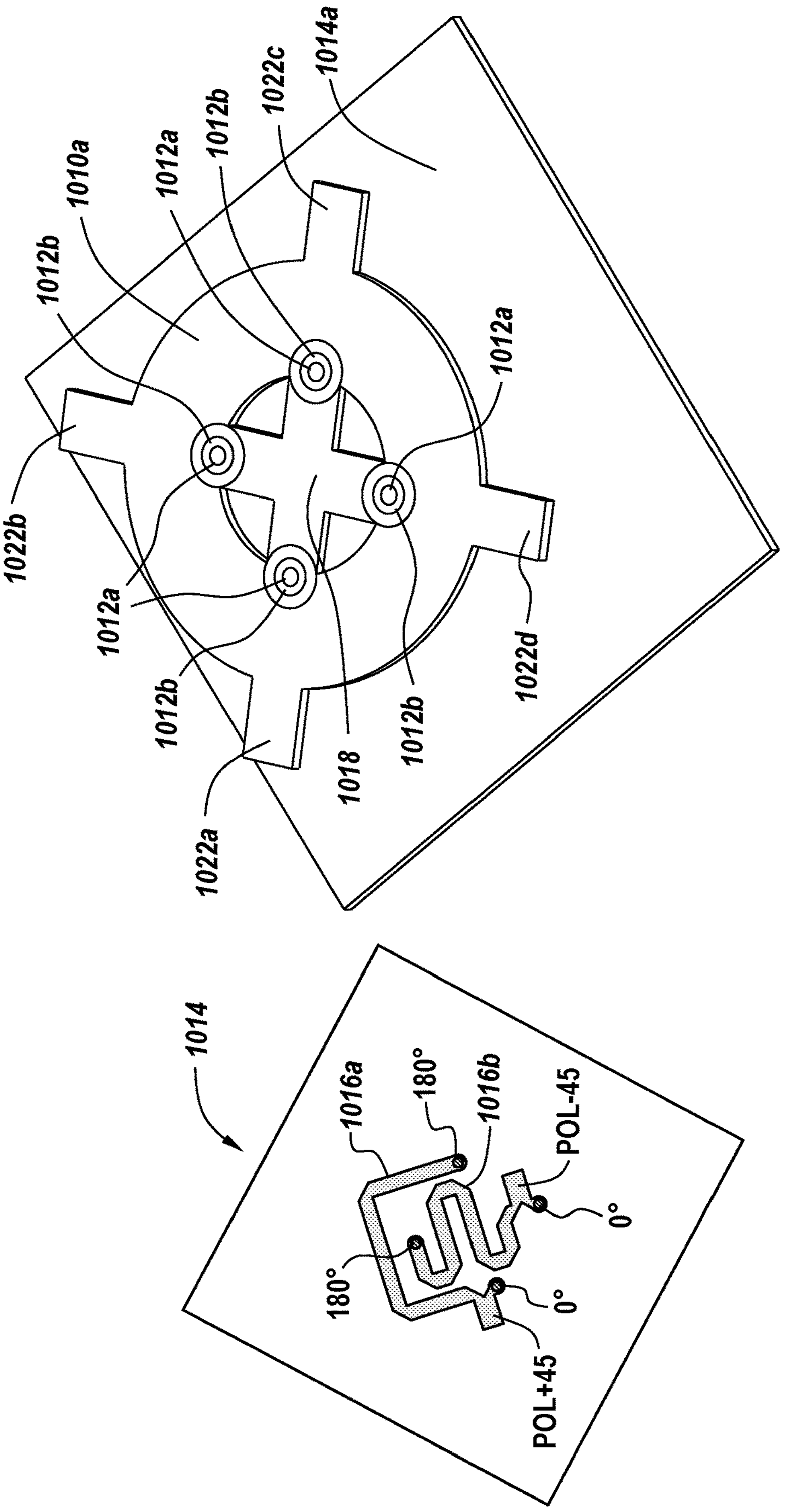
FIG. 11D is a: (i) top-down perspective view of a polymer-based radiating element with annular-shaped metallized radiating surface thereon and an underlying planar support base of a cross-polarized feed signal network, and a (ii) rear side view of the planar support base containing a pair of metal traces that support generation of four feed signals (0° and 180° at p1 (+45) polarization, and 0° and 180° at n1 (−45) polarization) from two cross-polarized input feed signals.

As shown best by FIG. 11D, the annular-shaped metallized radiating surface 1010*a* may be capacitively and inductively coupled to the four electrically conductive cores 1012*a* within the four polymer posts 1012. These four electrically conductive cores 1012*a* are electrically connected to corresponding ends of a pair of metal traces 1016*a*, 1016*b*, which are patterned on a rear side 1014*b* of the planar support base 1014. As shown, the pair of metal traces 1016*a*, 1016*b* support the generation of four feed signals (0° and 180° at p1 (+45) polarization, and 0° and 180° at n1 (−45) polarization) from a corresponding pair of cross-polarized input feed signals (p1 (+45), n1 (−45)). Based on this configuration, the electrically conductive cores 1012*a* within the cross-polarized feed signal network transfer four feed signals through the interiors of vertical posts/probes 1012, and these four feed signals are capacitively and inductively coupled to respective portions of the annular-shaped metallized radiating surface 1010*a*.

As further illustrated by FIG. 11D, a centrally-located, cross-shaped, and metallized radiating extension 1018 may also be provided as part of the RF radiator 1010. The metallized radiating extension 1018 is electrically coupled at four distal ends thereof to an interior perimeter of the annular-shaped metallized radiating surface 1010*a*, and the electrically conductive cores 1012*a* within the four polymer posts 1012. Preferably, the electrically conductive cores 1012*a* are terminated by annular-shaped metal terminations 1012*b*, which are separated and spaced apart from the annular-shaped metallized radiating surface 1010*a* and the corresponding distal ends of the cross-shaped radiating extension 1018. As shown, the centers of the electrically conductive cores 1012*a* and the centers of the annular-shaped terminations 1012*b* are generally aligned with the inner circular circumference of the annular-shaped metallized radiating surface 1010*a*. Based on this configuration, the annular-shaped radiating surface 1010*a* and the distal ends of the cross-shaped radiating extension 1018 are series "LC" fed by the electrically conductive cores 1012*a* within the polymer posts, which provide a coupled inductance "L" along their full height, and a coupled capacitance "C" across the gaps between the terminations 1012*b* and the annular-shaped radiating surface 1010*a* and the radiating extension 1018.

In addition, a first pair of collinear and metallized extension strips 1022*a*, 1022*c* and a second pair of collinear and metallized extension strips 1022*b*, 1022*d* may be provided, which are part of the RF radiator 1010 and extend radially outward from an exterior perimeter of the annular-shaped metallized radiating surface 1010*a*. Preferably, the first pair of collinear and metallized extension strips 1022*a*, 1022*c* are aligned and collinear with a first radiating extension within the cross-shaped and metallized radiating extension 1018, and the second pair of collinear and metallized extension strips 1022*b*, 1022*d* are aligned and collinear with a second radiating extension within the cross-shaped and metallized radiating extension 1018, which extends orthogonally relative to the first radiating extension. Advantageously, the polymer-based radiating element 1100' of FIG. 11C may be utilized as a substitute for one or more cross-dipole radiating elements within a beam forming antenna, including the beam forming antennas disclosed in commonly assigned U.S. Provisional Application Ser. No. 62/779,468, filed Dec. 13, 2018, the disclosure of which is hereby incorporated herein by reference.

Figure 12A:
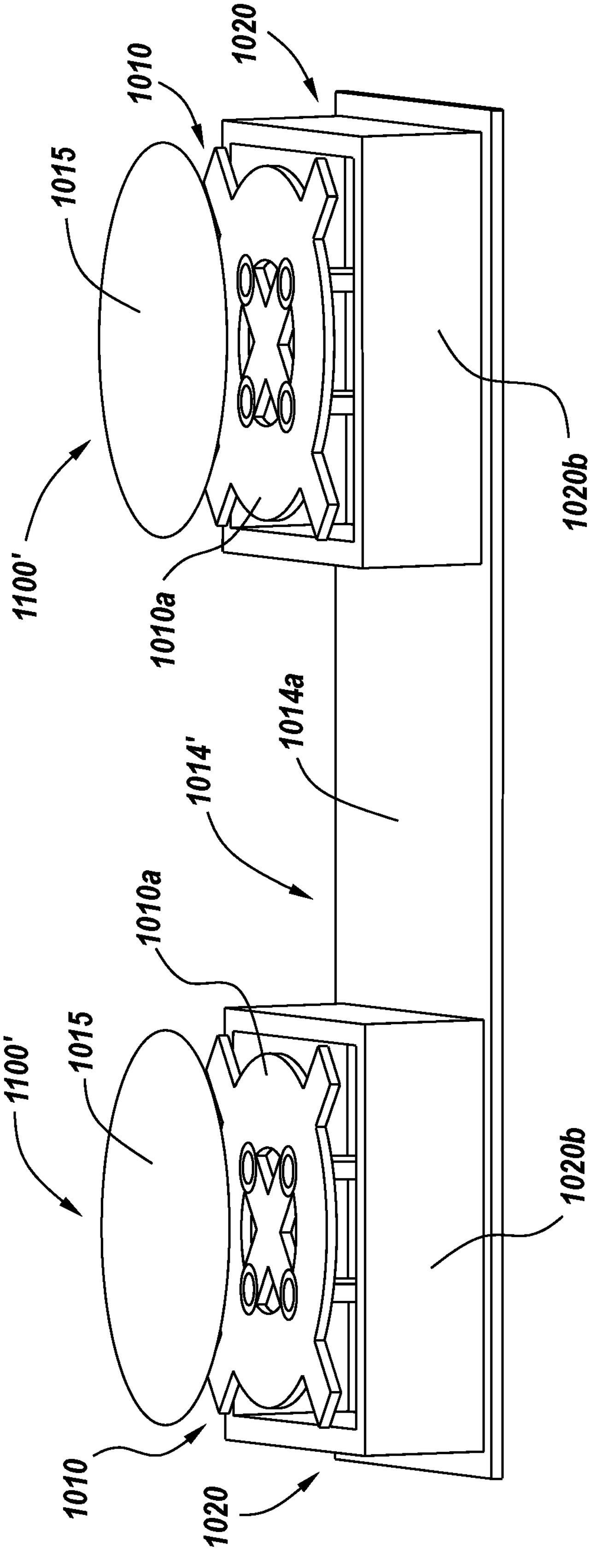
FIG. 12A is a side perspective view of two instances of the fully assembled polymer-based radiating element with cross-polarized feed signal network and four-sided isolation wall of FIG. 11C, on a shared planar support base, according to an embodiment of the invention.

Referring now to FIG. 12A, a side perspective view of two instances of the fully assembled polymer-based radiating element 1100' of FIG. 11C is provided. As shown, the pair of radiating elements 1100' are disposed side-by-side on a shared planar support base 1014' having a metallized forward-facing surface 1014*a*.

Figure 12B:
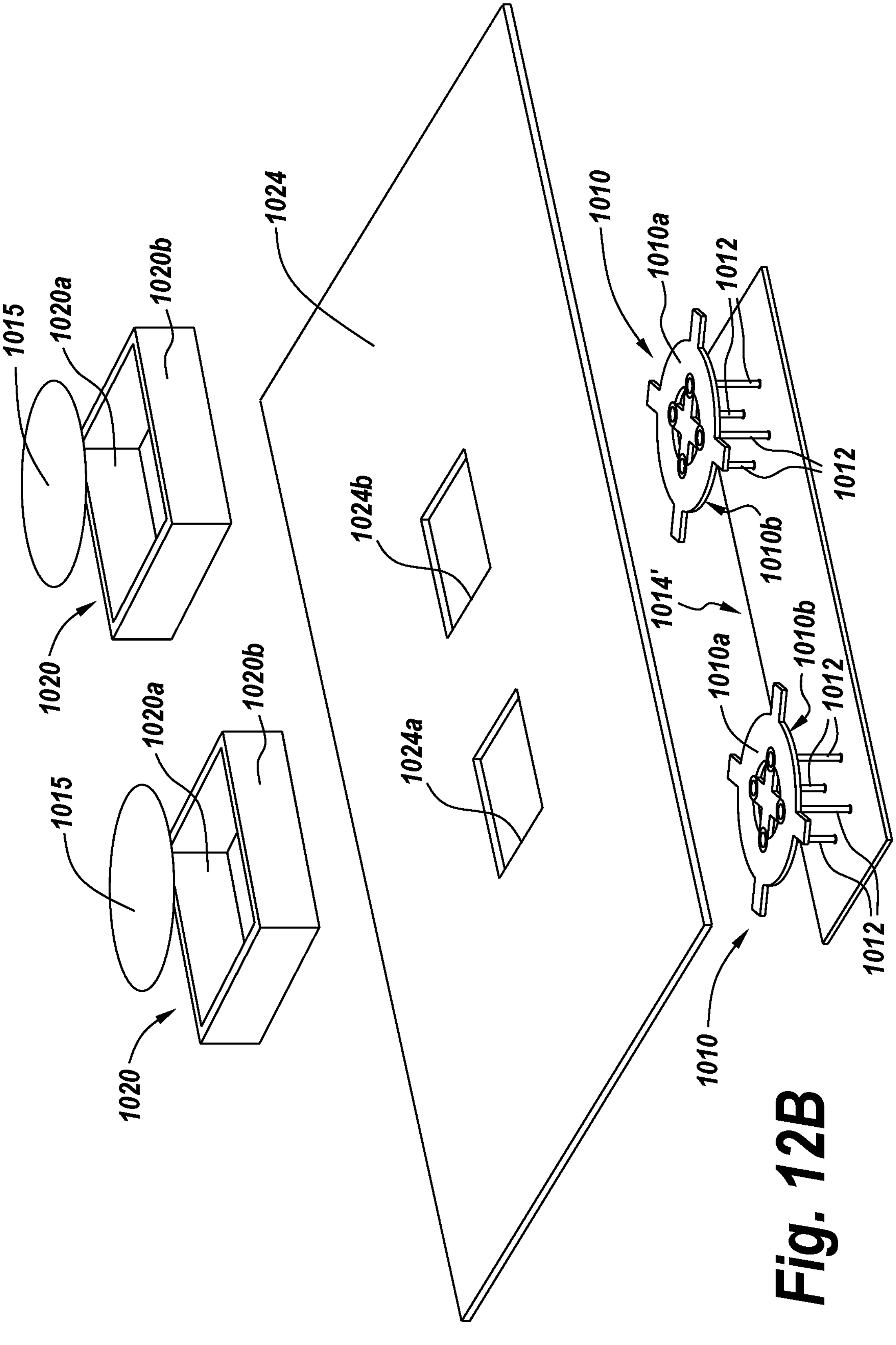
FIG. 12B is a side exploded view of the antenna of FIG. 12A, as assembled with a metal ground-plane reflector, according to an embodiment of the invention.
Figure 12C:
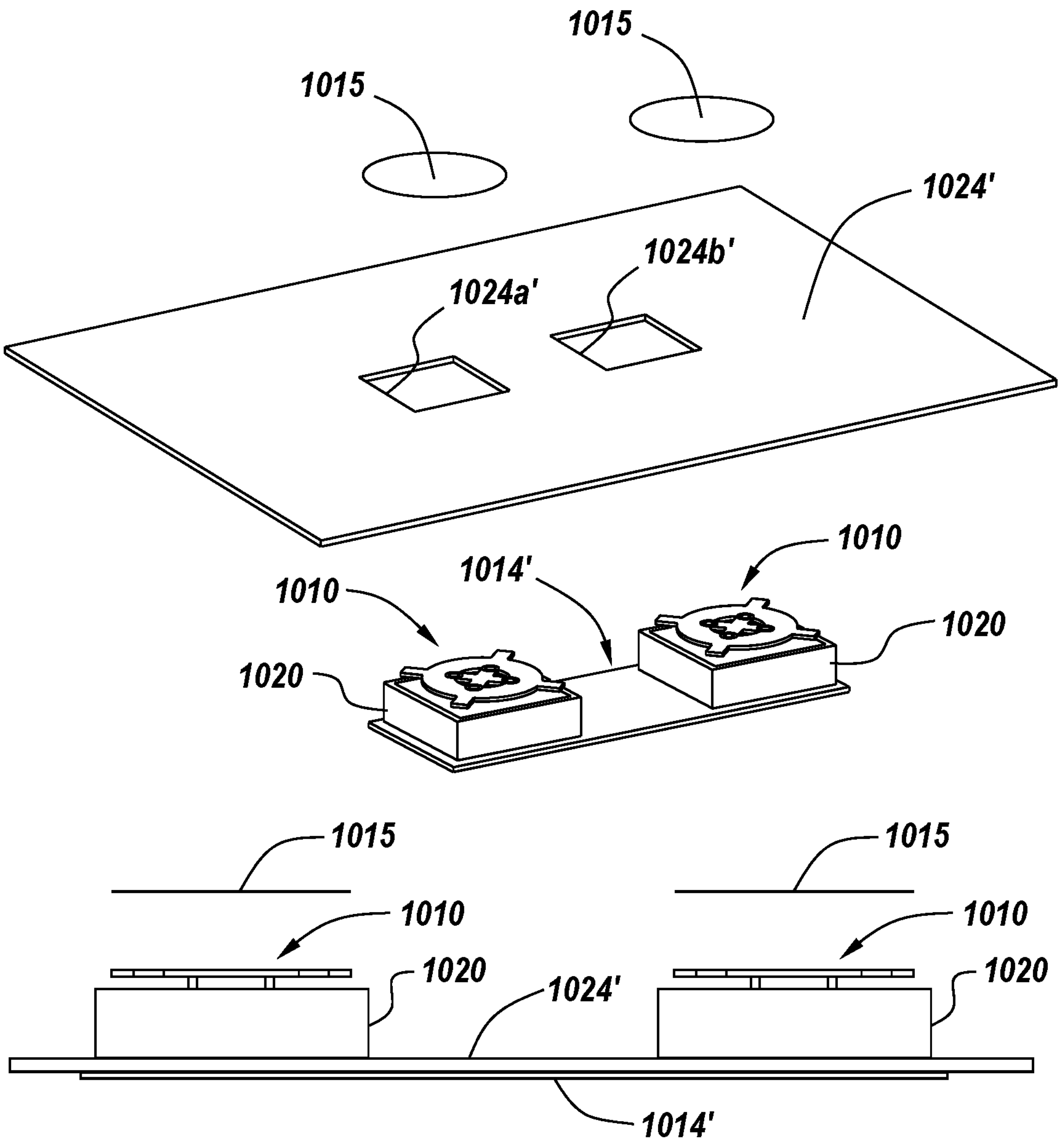
FIG. 12C is an alternative side exploded view and side view of the antenna of FIG. 12A, as assembled with a metal ground-plane reflector, according to an embodiment of the invention.

Variations on the "paired" radiating element embodiment of FIG. 12A are illustrated by FIGS. 12B and 12C. In particular, FIG. 12B provides an exploded side perspective view of the antenna of FIG. 12A, as assembled with an additional metal ground-plane reflector 1024 having a pair of square-shaped openings 1024*a*, 1024*b* therein. In addition, FIG. 12C provides an alternative exploded view and side view of the antenna of FIG. 12A, as assembled with a metal ground-plane reflector 1024' having a pair of square-shaped openings 1024*a*', 1024*b*' therein.

Referring now to FIG. 12B, a pair of the polymer-based radiating elements 1100 of FIG. 11A may be provided on a shared planar support base 1014'. Advantageously, the pair of annular-shaped radiators 1010 and the polymer posts 1012 associated therewith, and the shared planar support base 1014', are configured as a three-dimensional (3D) unitary polymer-based (e.g., nylon) structure, such as a 3D injection-molded plastic structure. Moreover, during assembly, the pair of annular-shaped radiators 1010 may be inserted through a corresponding pair of square-shaped openings 1024*a*, 1024*b* within a metal ground plane reflector 1024, during attachment of the support base 1014' to a rear surface of the reflector 1024. Thereafter, a pair of four-sided isolation walls 1020 may be mounted on a front surface of the reflector 1024, to thereby surround respective ones of the annular-shaped radiators 1010. Alternatively, as shown by FIG. 12C, somewhat larger square-shaped openings 1024*a*', 1024*b*' may be provided in the reflector 1024', to enable the pair of radiating elements 1100' of FIG. 12A, including four-sided isolation walls 1020, to be inserted therethrough upon attachment of the planar support base 1014' to the rear surface of the reflector 1024'.

Figure 13A:
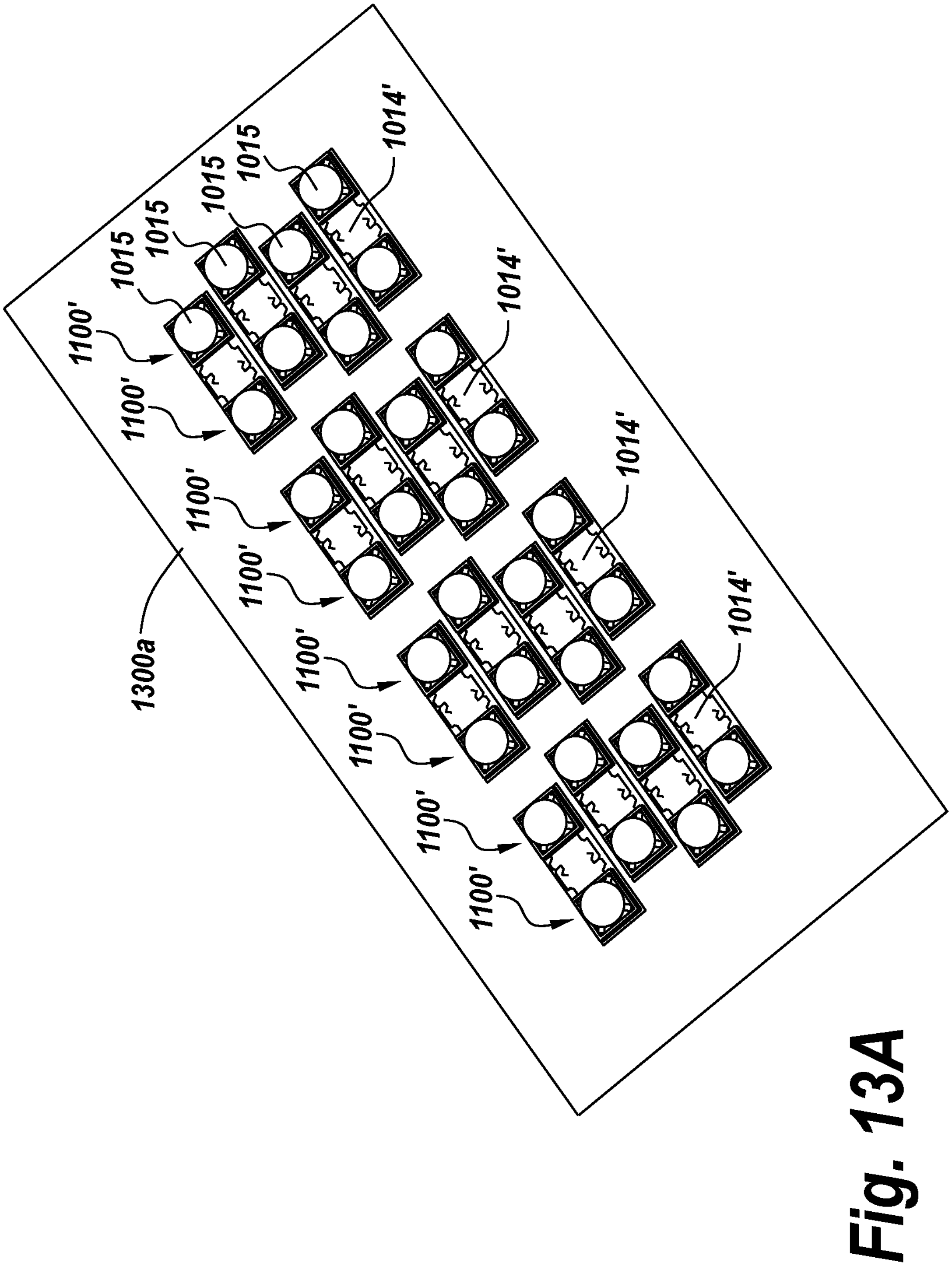
FIG. 13A is a top down perspective view of a 4×8 antenna array, which contains sixteen (16) instances of the fully assembled polymer-based radiating elements of FIG. 12A, according to an embodiment of the invention.
Figure 13B:
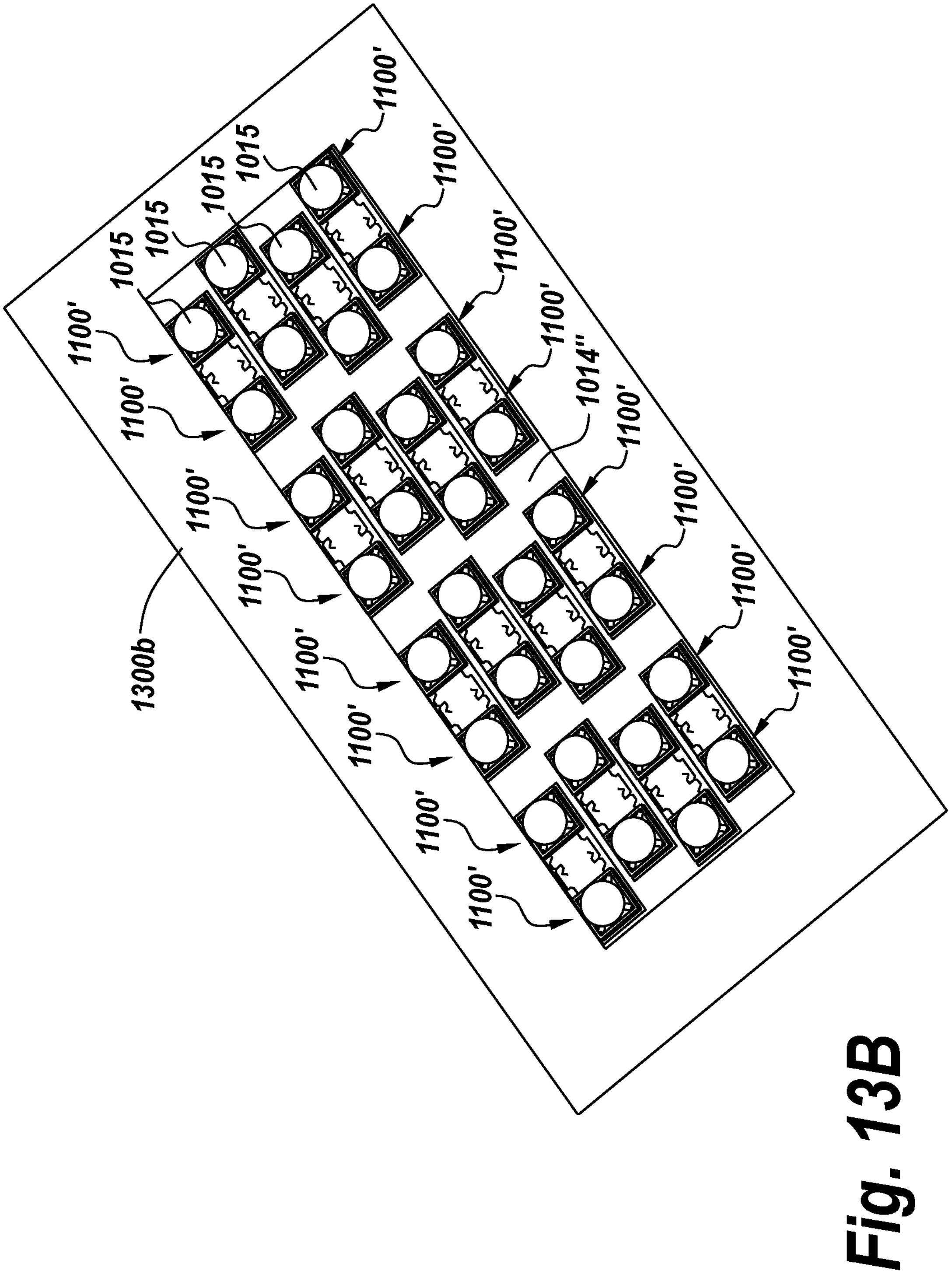
FIG. 13B is a top down perspective view of a 4×8 antenna array having a single piece planar support base, according to an embodiment of the invention.

Referring now to FIGS. 13A-13B, various highly integrated combinations of the polymer-based radiating elements 1100' of FIGS. 11C and 12A may be utilized to provide highly integrated and customizable antenna arrays of varying shapes and sizes. For example, as shown by FIG. 13A, a 4×8 antenna array 1300*a* is illustrated as including sixteen (16) staggered and spaced-apart instances of the paired radiating elements 1100' of FIG. 12A. And, as shown by FIG. 13B, a 4×8 antenna array 1300*b* is illustrated as including thirty two (32) staggered and spaced-apart instances of the radiating element 1100' of FIG. 11C, on a common and large area polymer support base 1014". Advantageously, the annular-shaped radiators, polymer posts and polymer support base 1014" associated with the radiating elements 1100' of FIG. 13B may be formed as a three-dimensional (3D) unitary structure, such as a 3D injection-molded plastic structure. In other words, the entire antenna array 1300*b* of FIG. 13B may be a unitary structure in some embodiments of the invention.

Figure 14A:
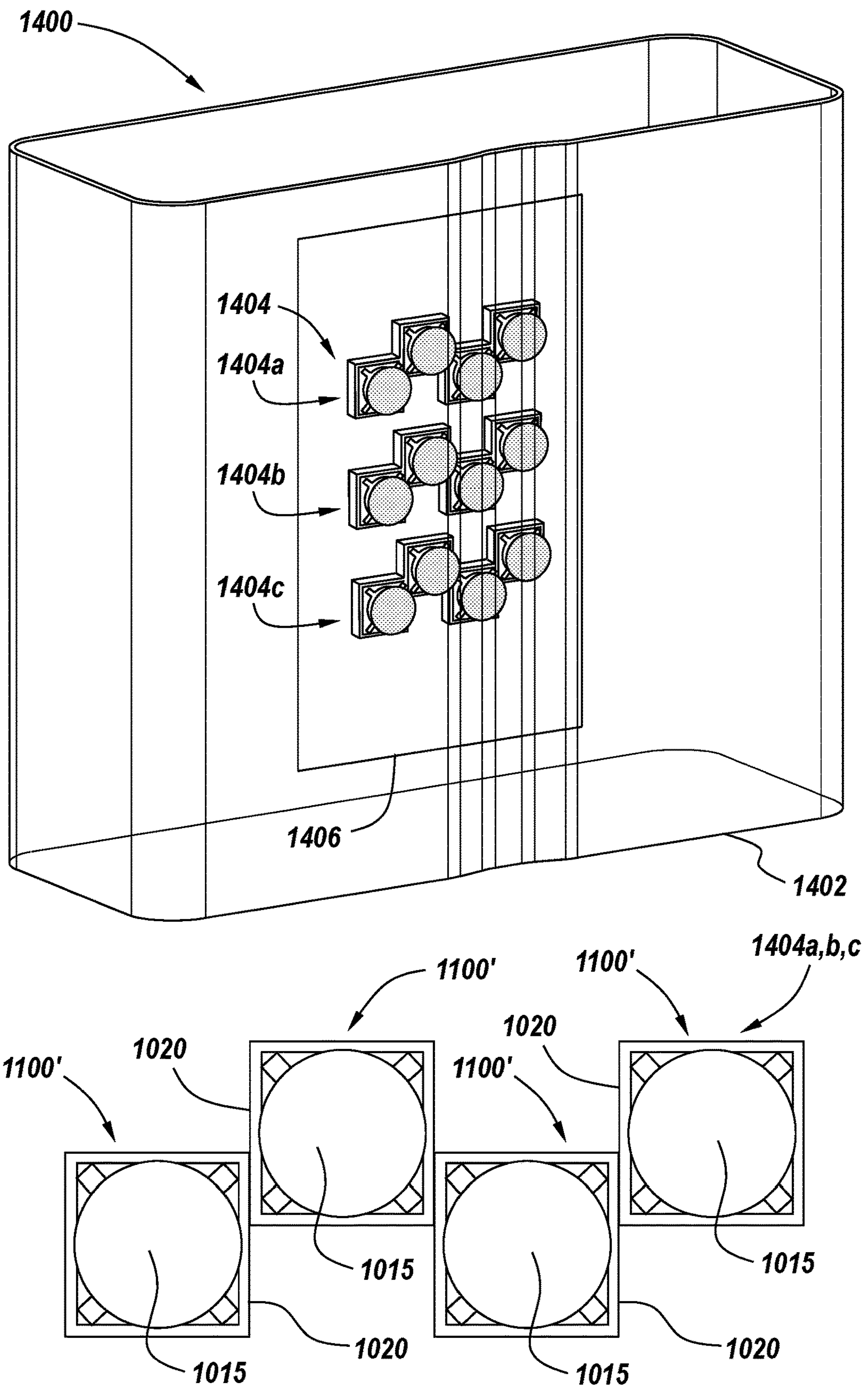
FIG. 14A is a perspective view of a 3×4 beamforming antenna array with staggered radiating elements, as mounted within an antenna radome, according to an embodiment of the invention, as well as an enlarged front view of one row of the staggered radiating elements.
Figure 14B:
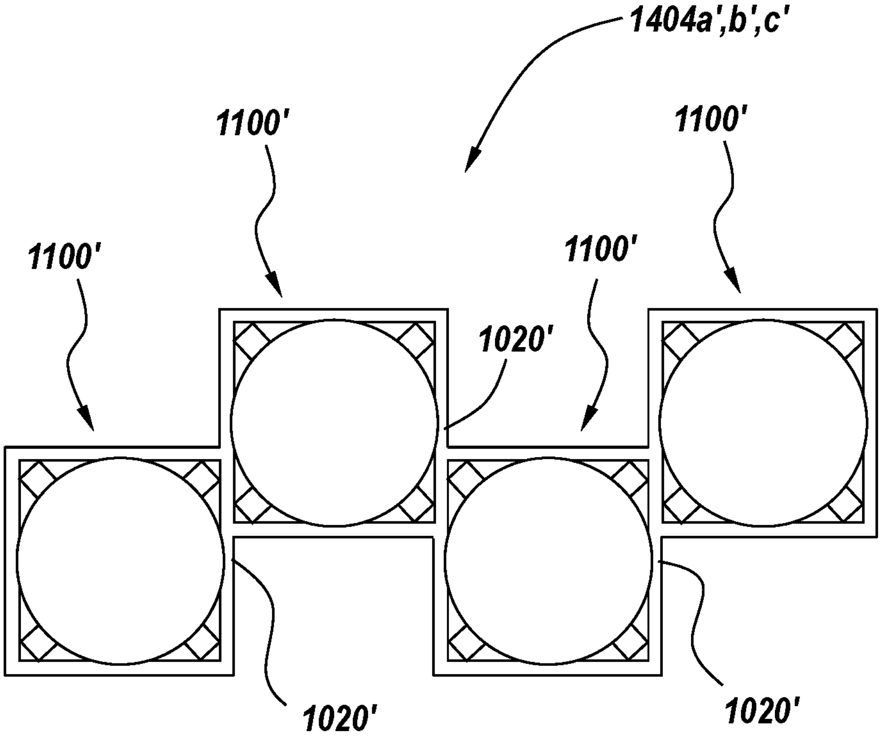
FIG. 14B is an alternative embodiment of the staggered radiating elements of FIG. 14A, according to an embodiment of the invention.

Referring now to FIGS. 14A-14B, a beamforming antenna 1400 according to an embodiment of the invention may include a 4 column staggered antenna array 1404 mounted on a vertically extending reflector 1406 within a radome 1402, as illustrated. The array 1404 includes the radiating elements 1100' of FIG. 11C arranged in 3 staggered rows: 1404*a*, 1404*b* and 1404*c*, with each radiating element 100' enclosed within a respective isolation wall 20, or enclosed within a larger composite isolation wall 1020' having shared wall segments that can be utilized advantageously to support closer element-to-element spacing within the array 1404, as illustrated by FIG. 14B.

As described above with reference to FIGS. 11A-11D, the polymer-based radiating elements 1100' according to some embodiments of the present invention include an annular-shaped RF radiator 1010 that comprises a metallized radiating surface 1010*a* that is formed on an annular-shaped polymer support 1010*b*. As shown best in FIG. 11D, the annular-shaped RF radiator 1010 may include first and second pairs of collinear and metallized extension strips 1022*a*, 1022*c*; 1022*b*, 1022*d*. The pairs of metallized extension strips 1022*a*, 1022*c*; 1022*b*, 1022*d* may shift the resonant frequency for the annular-shaped RF radiator 1010 toward lower frequencies, providing a better impedance match at lower frequencies. This may allow a reduction in the size of the annular-shaped RF radiator 1010, which allows shrinking the overall size of the radiating element 1100'. The first and second pairs of extension strips 1022*a*, 1022*c*; 1022*b*, 1022*d*, however, also increase the overall size of the radiating element 1100' since the pairs of extension strips 1022*a*, 1022*c*; 1022*b*, 1022*d* extend outwardly from the annular-shaped metallized radiating surface 1010*a* and underlying support 1010*b*. While the overall increase in size caused by the pairs of extension strips 1022*a*, 1022*c*; 1022*b*, 1022*d* is mitigated by the fact that the extension strips 1022*a*, 1022*c*; 1022*b*, 1022*d* are mounted to extend towards the corners of the four-sided (square) isolation wall 20 as shown in FIG. 11C, the extension strips 1022*a*, 1022*c*; 1022*b*, 1022*d* may still extend far enough outwardly from the annular-shaped metallized radiating surface 1010*a* to require an increase in the size of the four sided isolation wall 1020. Pursuant to further embodiments of the present invention, polymer-based radiating elements 1500' are provided that include pairs of extension strips 1522*a*, 1522*c*; 1522*b*, 1522*d* that have reactive circuits formed therein that may facilitate a reduction in the size of the extension strips 1522*a*-1522*d* and/or an increase in the impedance matching bandwidth of the radiating element 1500'.

Figure 15A:
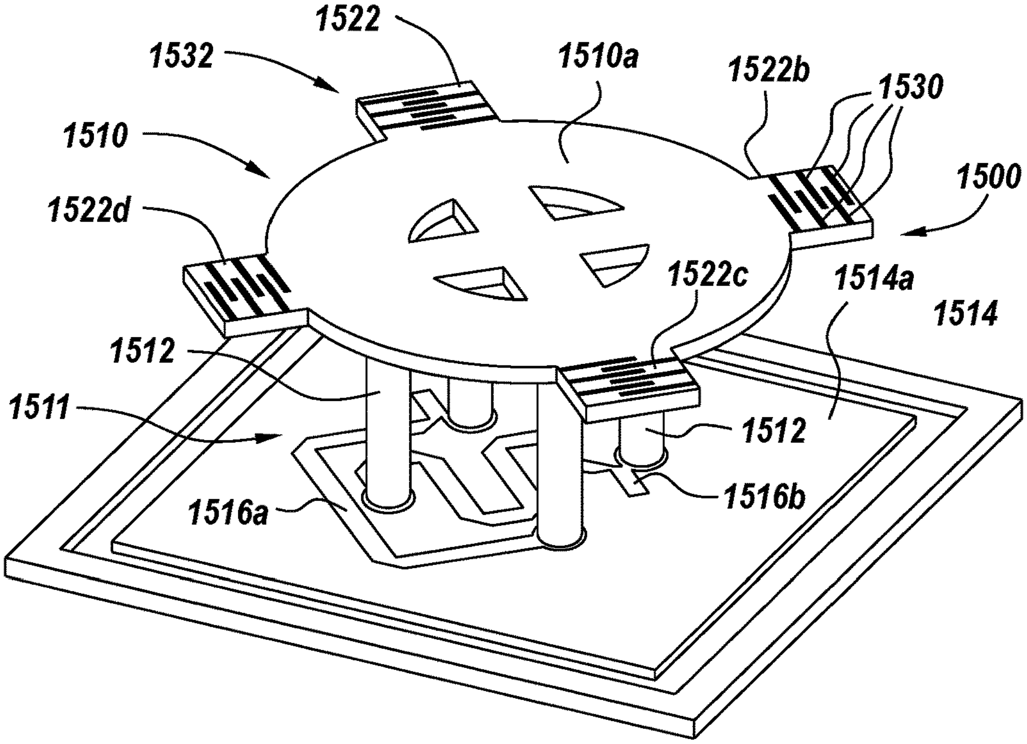
FIG. 15A is a front perspective view of a polymer-based radiating element and cross-polarized feed signal network according to another embodiment of the invention.
Figure 15B:
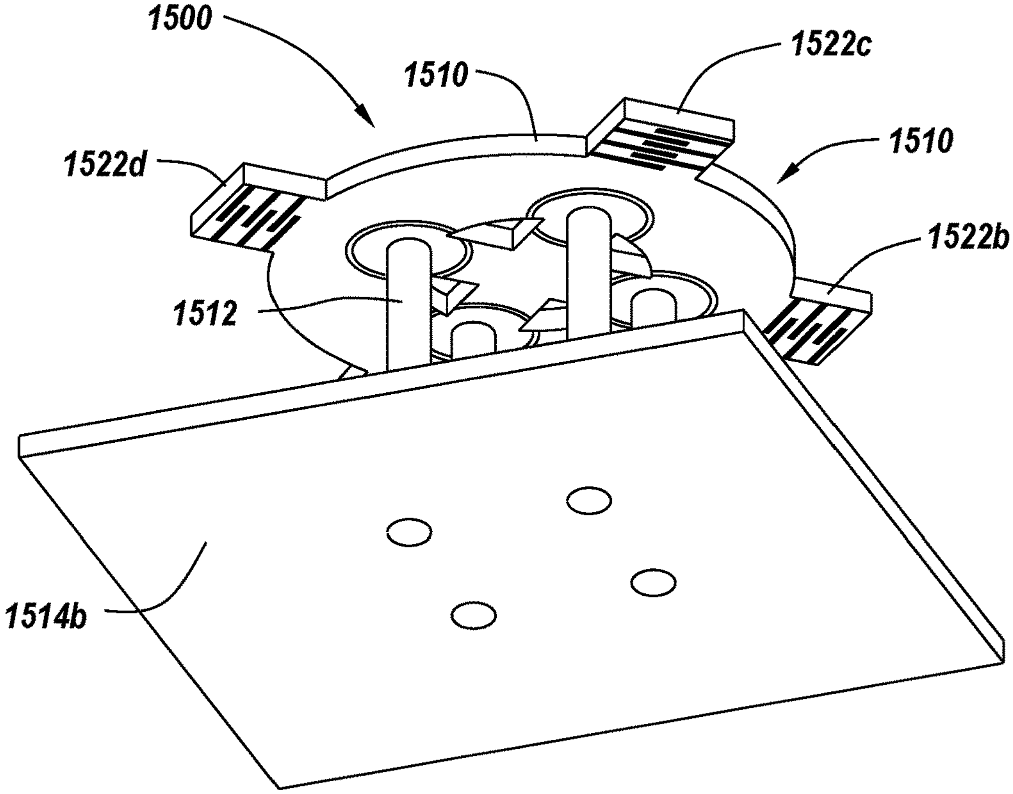
FIG. 15B is a rear perspective view of the polymer-based radiating element and cross-polarized feed signal network of FIG. 15A.
Figure 15C:
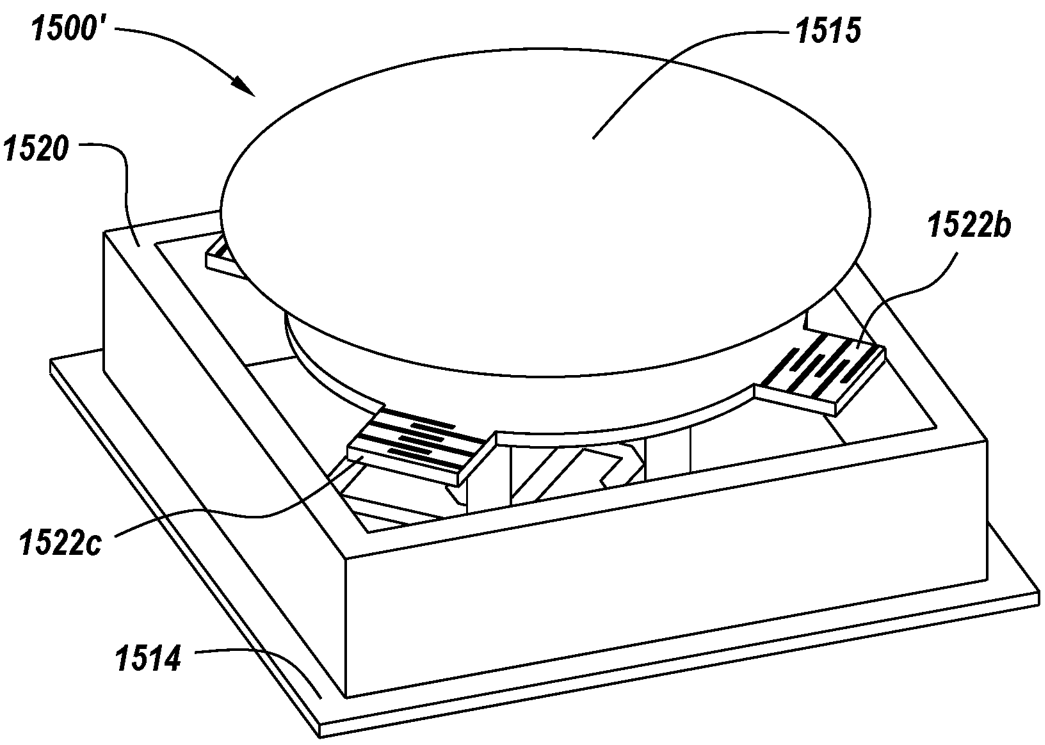
FIG. 15C is a perspective view of the polymer-based radiating element and cross-polarized feed signal network of FIGS. 15A and 15B when fully assembled to include a four-sided isolation wall and an RF director.

Referring to FIGS. 15A-15C, a radiating element 1500 is illustrated that includes extension strips 1522*a*-1522*d* having such reactive circuits. In particular, FIG. 15A is a front perspective view of the radiating element 1500 that illustrates the annular-shaped RF radiator 1510 of radiating element 1500 and a cross-polarized feed signal network 1511 that is used to couple RF signals to and from the RF radiator 1510. FIG. 15B is a rear perspective view of the radiating element 1500, and FIG. 15C is a front perspective view of a fully assembled radiating element 1500' that includes the radiating element 1500 of FIGS. 15A-15B as well as a four sided isolation wall 1520 and a director 1515.

Referring to FIGS. 15A-15B, the RF radiator 1510 comprises an annular-shaped metallized radiating surface 1510*a* that is formed on an underlying annular-shaped polymer support 1510*b*. Both the front and rear sides of the polymer support 1510*b* are metallized. The RF radiator 1510 is supported forwardly of a support base 1514 by four metallized polymer posts 1512, which also serve to electrically connect the RF radiator 1510 to the support base 1514. The RF radiator 1510 further includes a centrally-located, cross-shaped, and metallized radiating extension 1518 that is electrically coupled at four distal ends thereof to the interior perimeter of the annular-shaped metallized radiating surface 1510*a*. While not shown in FIG. 15A to simplify the drawing, the cross-shaped, and metallized radiating extension 1518 and/or the annular-shaped metallized radiating surface 1510*a* is electrically coupled to the four metallized polymer posts 1512. This electrical connection may comprise a direct electrical connection, or a capacitive connection as described above with reference to FIG. 11D.

The RF radiator 1510 further includes a first pair of collinear extension strips 1522*a*, 1522*c* and a second pair of collinear extension strips 1522*b*, 1522*d* that each extend radially outward from an exterior perimeter of the annular-shaped metallized radiating surface 1510*a* and the underlying annular-shaped polymer support 1510*b*. Reactive circuits may be built into one or more of the extension strips 1522*a*-1522*d* that may be used to reduce the size of the extension strips 1522*a*-1522*d* and/or to expand the impedance matching bandwidth of the radiating element 1500. In the depicted embodiment, a series of stripes 1530 are provided on each extension strip 1522*a*-1522*d*, with each stripe 1530 being a region that is free of metallization. Each stripe 1530 extends in a direction that is generally transverse to the longitudinal direction of each radially extending extension strip 1522*a*-1522*d*. The stripes 1530 create a meander line circuit 1532 on each extension strip 1522*a*-1522*d*, where the meander line circuit 1532 is the circuitous current path defined by the metallization on each extension strip 1522*a*-1522*d* that remains between the stripes 1530. As can be seen in FIGS. 15A and 15B, stripes 1530 may be provided on the extension strips 1522*a*-1522*d* on both sides of the radiator 1510 to create meander line circuits 1532 on the extension strips 1522*a*-1522*d* on both sides of the radiator 1510.

Figure 15D:
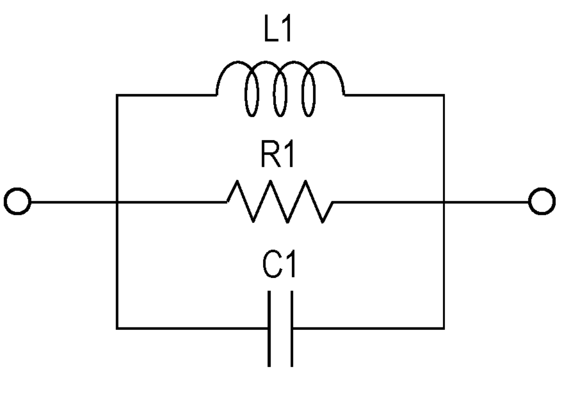
FIG. 15D is a circuit diagram of an equivalent circuit of the meander line formed on each metallized extension strip of the annular-shaped metallized radiating surface of the polymer-based radiating element of FIGS. 15A-15C.

By forming meander line circuits 1532 on each extension strip 1522*a*-1522*d*, the length of the current path along each extension strip 1522*a*-1522*d* is increased and the width of each current path is narrowed. As a result, each meander line circuit 1532 may be viewed as an inductor and a resistor that are electrically disposed in parallel. In addition, capacitive coupling occurs across the stripes 1530 and/or through the polymer support 1510*b*, and hence the provision of the meander line circuit 1532 also adds a capacitor in parallel to the inductor and the resistor, as is shown in the equivalent circuit diagram for the meander line strip that is depicted in FIG. 15D. The circuit of FIG. 15D is a band stop filter, and by properly selecting the values for L1, R1 and C1, the filter can be tuned to broaden the impedance matching bandwidth of the radiating element 1500.

While the meander line circuits 1532 shown in FIGS. 15A-15B illustrate one possible way of implementing the filter of FIG. 15D, it will be appreciated that other implementations are possible. Additionally, it will be appreciated that filter designs other than a band stop filter may be implemented on the extension strips 1522*a*-1522*d* in order to improve the impedance matching bandwidth of the patch radiator 1510. For example, low pass filters, high pass filters and/or band pass filters may be implemented on the extension strips 1522*a*-1522*d* in other embodiments. These filters may be implemented, for example, by only metallizing selected portions of the extension strips 1522*a*-1522*d* in order to form inductors, capacitors and/or resistors within the extension strips 1522*a*-1522*d*. In each case, by forming appropriate filter circuits within the extension strips 1522*a*-1522*d* the length of the extension strips 1522*a*-1522*d* may be reduced and/or the impedance bandwidth of the radiating element 1500 may be increased.

It should be noted that the current path along each meander line circuit 1532, while primarily flowing transversely, will have an average current flow direction that extends along the radial direction of the respective extension strips 1522*a*-1522*d*. As a result, the meander line circuits 1532 maintain the proper polarization that is applied to the RF signals and will not contribute to degraded cross-polarization performance.

FIG. 5C illustrates the radiating element 1500 of FIGS. 15A-15B assembled together with a four-sided isolation wall 1520 having an outer sidewall 1520*b* and a metallized inner sidewall 1520*a*, as well as an RF director 1515 that is mounted forwardly of the RF radiator 1510 in order to provide a fully-assembled radiating element 1500'. While the radiating elements 1500, 1500' include extension strips 1522*a*-1522*d* that have the meander line circuits 1532 formed therein, the radiating elements 1500, 1500' may otherwise be identical to the respective radiating elements 1100, 1100' of FIGS. 11A-11D. As such, further description of the radiating elements 1500, 1500' will be omitted.

As discussed above with reference to FIGS. 12A-12C, two or more of the radiating elements according to embodiments of the present invention (e.g., the radiating elements 1100, 1100', 1500 or 1500') may be mounted on a shared planar support base to form a radiating unit. For example, as described above with reference to FIGS. 12A-12C, first and second radiating elements 1100' may share a common support base 1014' as opposed to each having individual support bases as shown in the embodiments of FIGS. 11A-11D. The forward facing surface 1014*a* of the planar support base 1014' may be metallized and may serve as a ground plane, and a pair of metal traces 1016*a*, 1016*b* may be formed on the rear side 1014*b* of the planar support base 1014, with a separate pair of metal traces 1016*a*, 1016*b* being provided for each radiating element 1100' implemented on the shared support base 1014'. As shown in FIGS. 12B and 12C, the two radiating elements 1100' that are formed on the shared support base 1014' may be inserted through a corresponding pair of square-shaped openings 1024*a*, 1024*b* in a reflector 1024 in order to assemble an antenna that includes a two element array of radiating elements 1100'.

One potential issue with the designs shown in FIGS. 12B and 12C is that the metallized forward facing surface 1014*a* of the shared planar support base 1014' faces the rear surface of the metal reflector 1024. It may be difficult to implement such a large metal-to-metal interface without there being inconsistent metal-to-metal connections between the metallized forward facing surface 1014*a* of the shared planar support base 1014' and the metal reflector 1024, particularly as this interface typically would not be implemented as a soldered or welded interface. As is known to those of skill in the art, such inconsistent metal-to-metal interfaces are potential sources for passive intermodulation ("PIM") distortion, which refers to a type of RF interference that can severely degrade the performance of a communication system. While the metal-to-metal connection between the metallized forward facing surface 1014*a* of the shared planar support base 1014' and the metal reflector 1024 may be avoided by placing a dielectric sheet between the metallized forward facing surface 1014*a* and the metal reflector 1024 or through the use of other separation techniques such as stand-offs, such techniques may result in the portions of the metallized forward facing surface 1014*a* of the shared planar support base 1014' that are behind the openings 1024*a*, 1024*b* in the reflector 1024 also being spaced apart (i.e., rearwardly) from the reflector 1024 such that a gap is formed between the metallized forward facing surface 1014*a* of the shared planar support base 1014' and the reflector 1024. This gap may negatively impact the performance of the radiating elements 1100', with the embodiment of FIG. 12B being particularly vulnerable to such performance degradation.

Figure 16A:
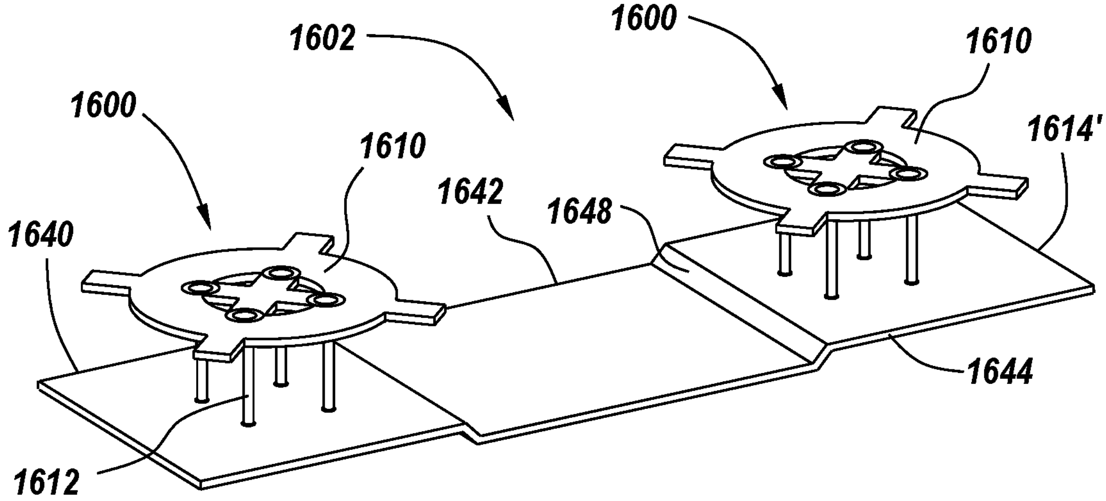
FIG. 16A is a front perspective view of a radiating unit that includes a pair of polymer-based radiating elements mounted on a common support base.
Figure 16B:
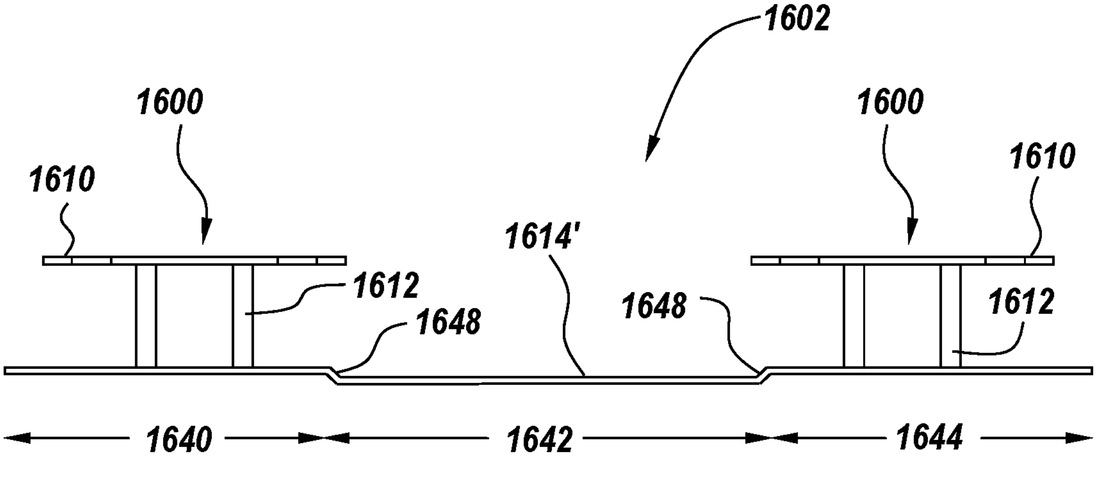
FIG. 16B is a side view of the radiating unit of FIG. 16A.

Pursuant to further embodiments of the present invention, radiating units that are suitable for use in base station antennas (e.g., in beamforming arrays included in base station antennas) are provided that include a plurality of radiating elements according to embodiments of the present invention that are mounted on a shared, non-planar support base. FIGS. 16A-16B illustrate a radiating unit 1602 that includes first and second radiating elements 1600 that are mounted on a shared, non-planar support base 1614'. In particular, FIG. 16A is a front perspective view of the radiating unit 1602, FIG. 16B is a side view of the radiating unit 1602, and FIG. 16C is a rear view of the radiating unit 1602.

Figure 16C:
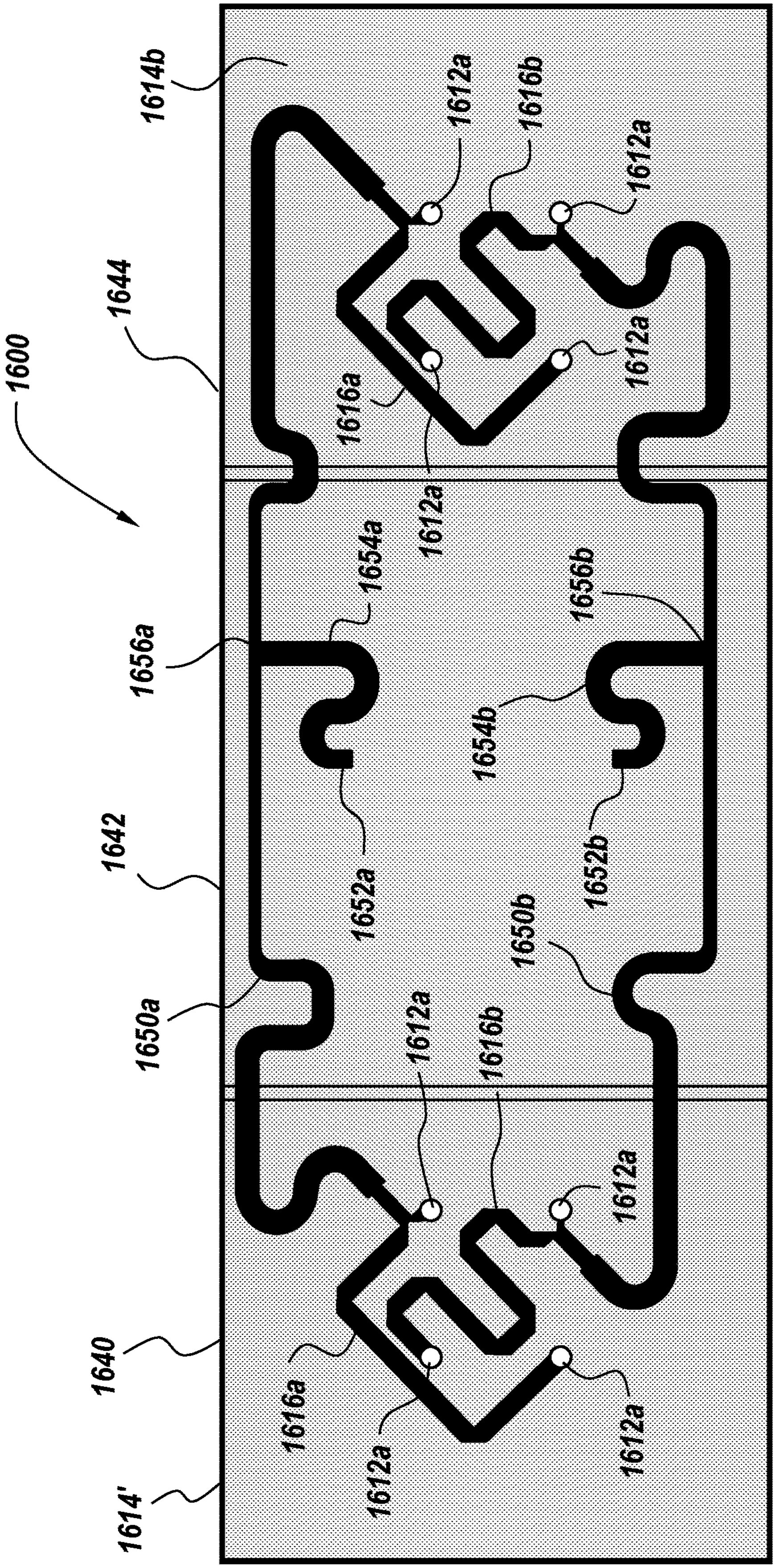
FIG. 16C is a rear view of the radiating unit of FIG. 16A.

As shown in FIGS. 16A-16C, the shared support base 1614' includes a bottom portion 1640, a central portion 1642 and a top portion 1644. Four metallized polymer posts 1612 are used to mount a first RF radiator 1610 to extend forwardly from the bottom portion 1640 of the shared support base 1614' and an additional four metallized polymer posts 1612 are used to mount a second radiator 1610 to extend forwardly from the top portion 1644 of the shared support base 1614'. In this embodiment, the polymer posts 1612 are "metallized" in that they each include a metal core that extends through a central longitudinal opening in the polymer post 1612.

All three sections 1640, 1642, 1644 are planar sections. However, the bottom and top portions 1640, 1644 lie in a first common plane and the central portion 1642 lies in a second plane that is rearward of the first plane and parallel thereto. A pair of angled transition sections 1648 connect the bottom portion 1640 to the central portion 1642 and the central portion 1642 to the top portion 1644. As discussed above, this non-planar design for the shared support base 1614' allows the bottom and top portions 1640, 1644 to be fully received within openings in a reflector (e.g., the openings 1024*a*, 1024*b* in reflector 1024 of FIG. 12B) while the central portion 1642 is disposed behind the reflector and electrically insulated from the reflector by, for example, one or more dielectric spacers or stand-offs.

Referring to FIG. 16C, which is a rear view of the radiator unit 1602, a pair of metal traces 1616*a*, 1616*b* are formed on the bottom portion 1640 of the rear side 1614*b* of the support base 1614'. The first metal trace 1616*a* extends between first and second of the electrically conductive cores 1612*a* of two of the polymer posts 1612, and the second metal trace 1616*b* extends between the third and fourth of the electrically conductive cores 1612*a* of the remaining two of the polymer posts 1612. Each metal trace 1616*a*, 1616*b* may have a length that is selected such that an RF signal having frequency that is equal to the center frequency of the operating frequency band for the radiating element 1600 will experience a 180° phase shift when traversing the respective metal trace 1616*a*, 1616*b*. Consequently, an RF signal that is input to metal trace 1616*a* will generate a first pair of RF feed signals that are 180° out of phase with each other that are fed to conductive cores 1612*a* of first and second of the polymer posts 1612. These RF feed signals pass from the conductive cores 1612*a* to the annular-shaped radiator 1010 and are used to generate a first antenna beam having a first polarization p1 (+45°). Likewise, an RF signal that is input to metal trace 1616*b* will generate a second pair of RF feed signals that are 180° out of phase with each other that are fed to conductive cores 1612*a* of third and fourth of the polymer posts 1612. These RF feed signals pass from the conductive cores 1612*a* to the annular-shaped radiator 1010 and are used to generate a second antenna beam having a second polarization p2 (−45°). A second pair of metal traces 1616*a*, 1616*b* are formed on the top portion 1644 of the rear side 1614*b* of the support base 1614' and operate in the same manner to feed the second radiating element 1600.

As is also shown in FIG. 16C, a first trace 1650*a* extends between the metal trace 1616*a* on the bottom portion 1640 of the support base 1614' and the metal trace 1616*a* on the top portion 1644 of the support base 1614'. A first RF input 1652*a* is provided on the central portion 1642 of the support base 1614' that may be connected to an external RF source. The first RF input 1652*a* may comprise, for example, a metal pad to which the center conductor of a coaxial cable may be soldered. An input trace 1654*a* connects the first RF input 1652*a* to a first power divider 1656*a* that may split an RF signal that enters the first power divider 1656*a* from the input trace 1654*a*. The first trace 1650*a* may comprise the two output legs of the first power divider 1656*a*, and may couple the signals output by the first power divider 1656*a* to the metal traces 1616*a* on the respective bottom and top portions 1640, 1644 of the support base 1614'. As is further shown in FIG. 16C, a second trace 1650*b* extends between the metal trace 1616*b* on the bottom portion 1640 of the support base 1614' and the metal trace 1616*b* on the top portion 1644 of the support base 1614'. A second RF input 1652*b* (e.g., a metal pad) is provided on the central portion 1642 of the support base 1614' that may be connected to a second external RF source. An input trace 1654*b* connects the second RF input 1652*b* to a second power divider 1656*b*. The second trace 1650*b* may comprise the two output legs of the second power divider 1656*b*, and may couple the signals output by the second power divider 1656*b* to the metal traces 1616*b*. Thus, the radiating unit 1602 may be used to split a pair of RF signals input thereto to feed the two radiating elements 1600'.

The remaining components of the radiating elements 1600 included in radiating unit 1602 may be identical to the similarly numbered components of radiating element 1100 of FIGS. 11A-11D, and hence further description of these components will be omitted.

Pursuant to still further embodiments of the present invention, the support base 1614' of FIGS. 16A-16C could be flipped over so that the pairs of metal traces 1616*a*, 1616*b* are formed on the forward facing surface 1614*a* of the support base 1614', and so that the metal ground plane is formed on the rear surface 1614*b* of the support base 1614'. In this embodiment, the outer surfaces of the polymer posts 1612 may be metallized instead of forming the polymer posts 1612 to have electrically conductive inner cores 1612*a* as was the case in the embodiment of FIGS. 16A-16C. Metallizing the outer surfaces of the polymer posts 1612 as opposed to forming inner metal cores 612*a* may be preferred in applications where, for example, it may be difficult to form the inner metal cores 1612*a* in the polymer posts 1612 due to, for example, the dimensions (e.g., length and diameter) of the polymer posts 1612 and/or the particular technique selected to metallize the support base 1614', the polymer posts 1612 and the annular-shaped RF radiator 1610.

Figure 17A:
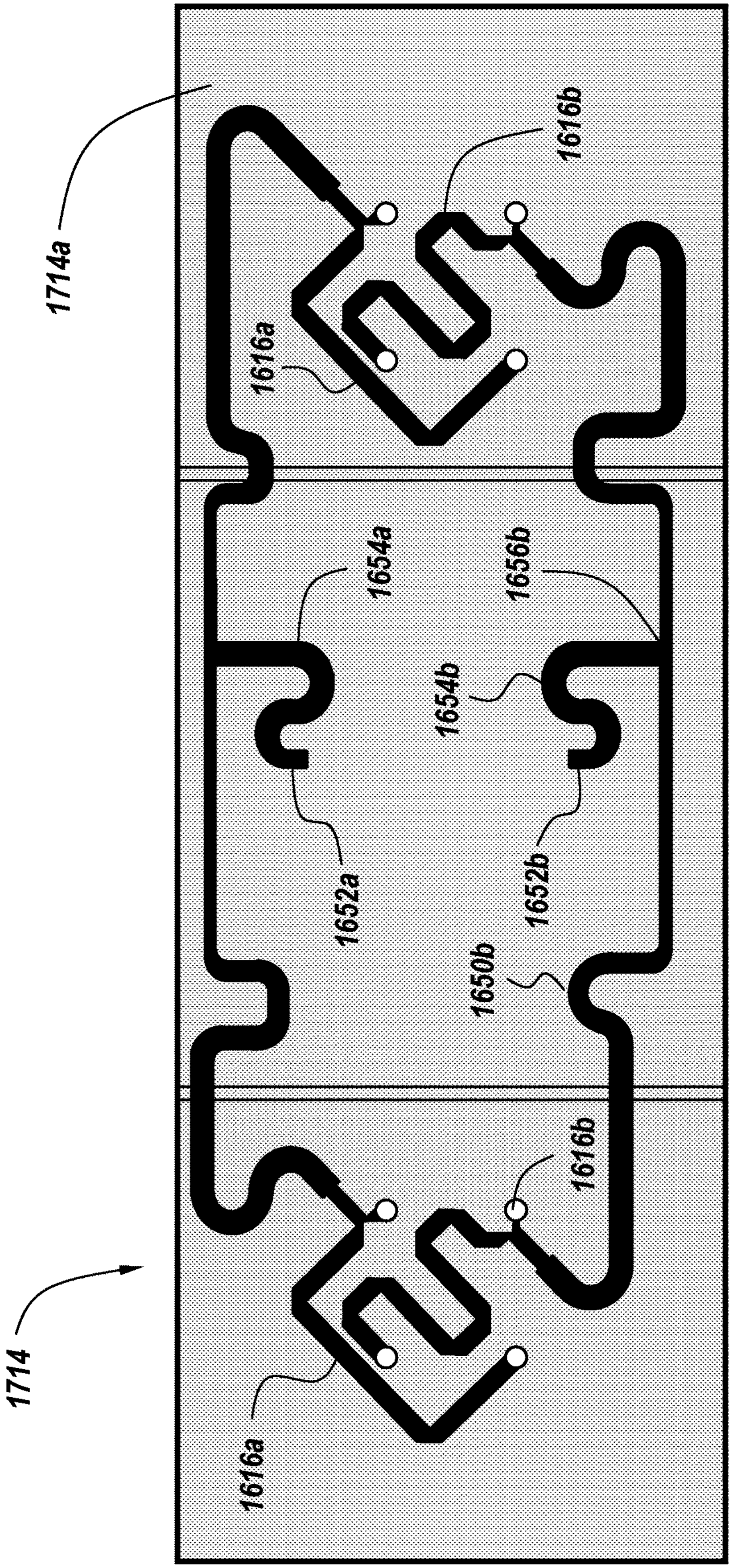
FIGS. 17A and 17B are front and rear views, respectively, of a support base according to further embodiments of the invention.
Figure 17B:
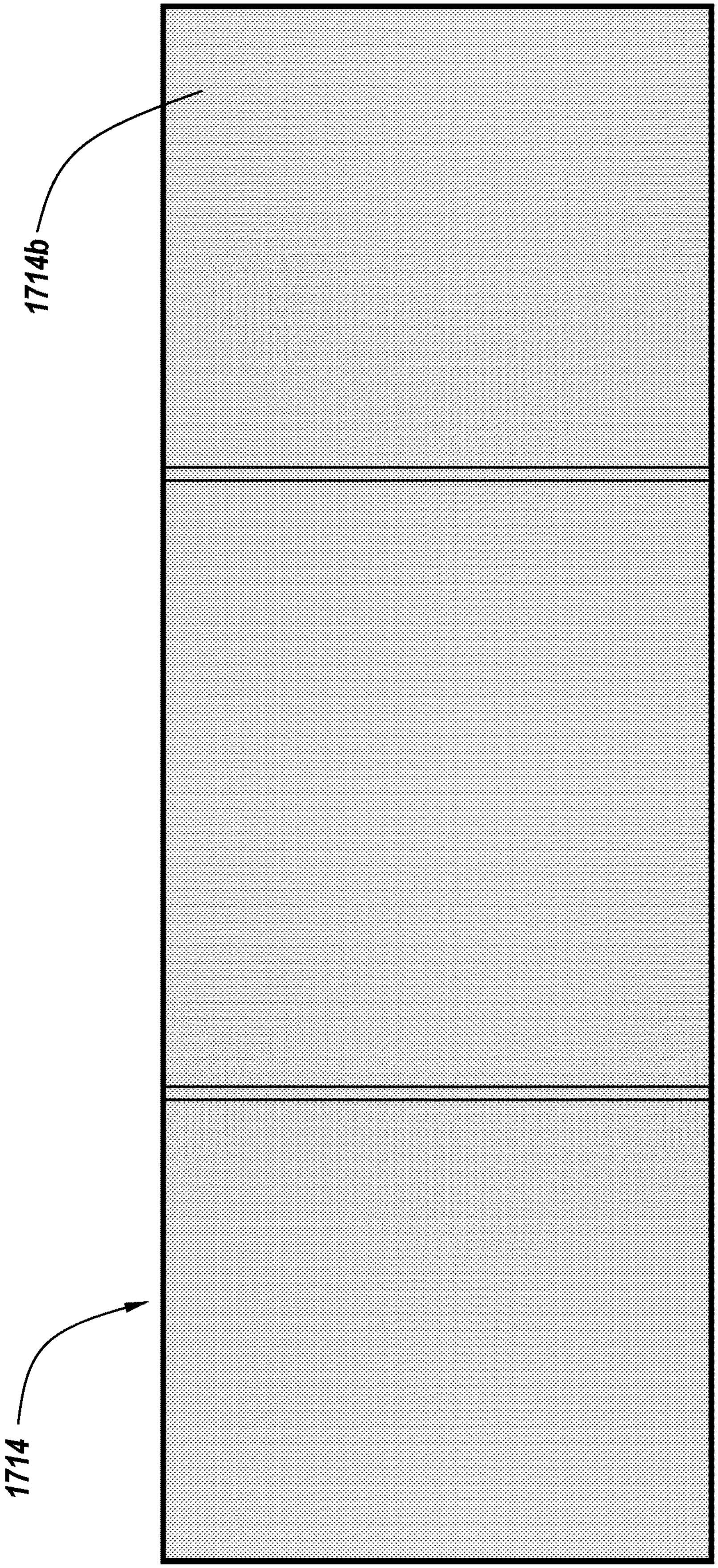

One potential disadvantage, however, of forming the metal traces 1616*a*, 1616*b* on the forward facing surface 1614*a* of the support base 1614' is that it may be more difficult to fabricate the radiating unit 1602 in embodiments where the support base 1614', the polymer posts 1612 and the annular-shaped RF radiator 1610 are all formed as a monolithic structure by selectively metallizing a polymer base structure, and this may particularly be true when the selective metallization process involves metallizing the entire polymer base structure and then selectively removing portions of the metal. FIGS. 17A and 17B are front and rear views, respectively, of a support base 1714' in which the pairs of metal traces 1616*a*, 1616*b* are formed on the forward facing surface 1714*a* and the ground plane is formed on the rear surface 1714*b* of the support base 1714'. Typically, the support base 1714' would be mounted on the front surface of the reflector 1024, with the ground plane on rear surface 1714*b* capacitively coupled to the reflector through a sheet of dielectric material or a dielectric coating on the ground plane. The support bases in any of the other embodiments of the invention described herein could similarly be flipped over and the polymer posts metallized externally instead of internally to provide a plurality of additional embodiments.

Figure 18:
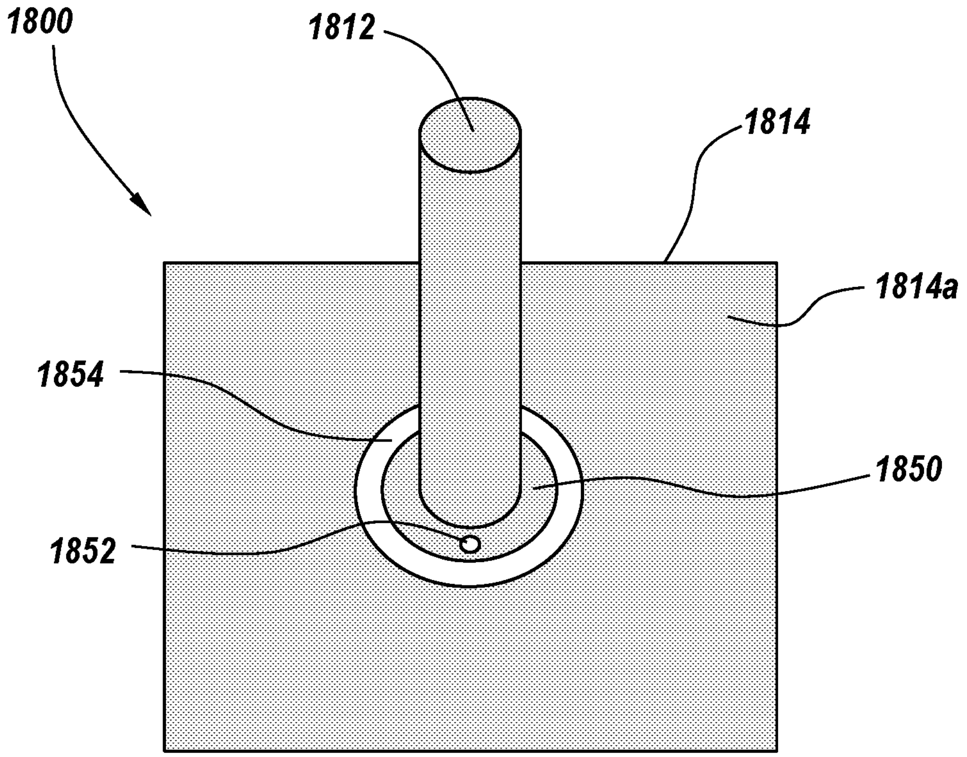
FIG. 18 is a perspective view of a portion of a support base and metallized polymer post of a radiating element according to further embodiments of the invention.

Referring to FIG. 18, a portion of a radiating element 1800 according to still further embodiments of the present invention is illustrated. In FIG. 18, only a small portion of the front surface 1814*a* of a support base 1814 is illustrated, along with one of the four metallized polymer posts 1812 that are used to mount the RF radiator (not shown) of the radiating element 1800 forwardly of the support base 1814. As shown in FIG. 18, the support base 1814 has a ground plane formed on the forward facing surface 1814*a* thereof. While not visible in FIG. 18, pairs of metal traces (which may be identical to metal traces 1016*a*, 1016*b* of FIG. 11D) are formed on the rear facing surface of the support base 1814. As is further shown in FIG. 18, the polymer post 1812 has a metallized outer surface, and a metal ring 1850 is formed around the base of the metallized polymer post 1812. The metal ring 1850 electrically connects to the metallized outer surface of the metallized polymer post 1812. A conductive via 1852 extends through the support base 1814 that electrically connects one of the metal traces (e.g., trace 1016*a*) that are formed on the rear facing surface of support base 1814 to the metal ring 1850. A spacer ring 1854 is provided on the front facing surface 1814*a* of the support base 1814 where no metallization is provided, the spacer ring 1854 surrounding the metal ring 1850. The spacer ring 854 electrically insulates the metal ring 1850 from the ground plane metallization that is on the remainder of the front surface 1814*a* of the support base 1814. Each of the remaining polymer posts (and the portions of the support base thereunder) may have the same configuration as shown in FIG. 18. The arrangement shown in FIG. 18 allows the metal traces 1016*a*, 1016*b* to be formed on the rear facing surface of support base 1814, where it may be easier to form such metal traces, while also allowing metallizing the outer surfaces of the polymer posts 1812 as opposed to forming electrically conductive inner cores.

While the embodiments of the present invention discussed above include radiating elements that are mostly or completely formed using metallized plastic, it will be appreciated that embodiments of the present invention are not limited thereto. Instead, in any of the above embodiments, one or more of the components of the radiating elements/radiating units may be formed using materials other than metallized plastic. As one example, the annular shaped radiators in any of the above embodiments may be formed from stamped sheet metal or using a printed circuit board in other embodiments. As another example, the above-described support bases may be implemented using printed circuit boards. As yet additional examples, the polymer posts may be implemented using metal rods, and/or the four-sided isolation walls may be formed of bent sheet metal. Thus, it will be appreciated that while some of the components of the radiating elements/radiating units described herein may be formed by metallizing a polymer based support structure, not all of the components need to comprise a metallized polymer. It will also be appreciated that the components that are formed as metallized polymers may all be formed as one unitary structure or may be formed as multiple different structures in different embodiments.

FIGS. 19A-19H_illustrate examples as to how the different components of the radiating elements and radiating units according to embodiments of the present invention may be formed as various combinations of unitary metallized polymer structure, separate metallized polymer structures and/or other structures such as sheet metal, printed circuit boards (PCB) or the like. It will be appreciated that each of the embodiments disclosed herein may be implemented as any of the different combinations shown in FIGS. 19A-19H. It will also be appreciated that FIGS. 19A-19H only show example combinations, and do not purport to be an exhaustive list.

Figure 19A:
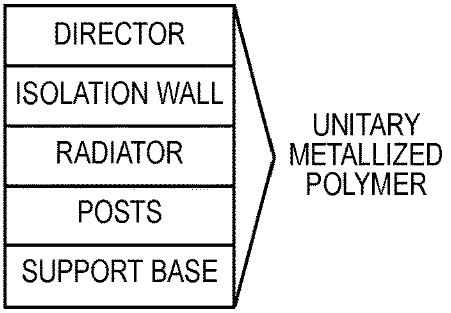
FIGS. 19A-19H illustrate different example configurations for the radiating elements and radiating units according to embodiments of the present invention.

As shown in FIG. 19A, in some embodiments, the entire radiating element and/or radiating unit may be formed as a unitary metallized polymer structure. Such an implementation may reduce manufacturing costs and simplify assembly. However, it may be difficult to form such a unitary structure using various manufacturing techniques.

Figure 19B:
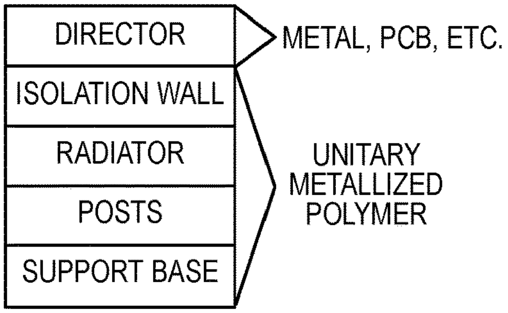
Figure 19C:
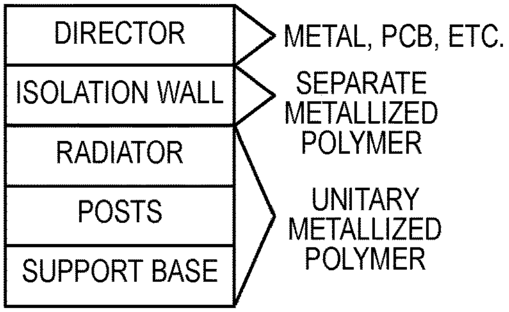

As shown in FIG. 19B, in other embodiments, the support base, posts, radiator and isolation wall may be formed as a unitary metallized polymer structure, while the director may be formed as a separate piece (typically as a stamped sheet metal director). As shown in FIG. 19C, in still other embodiments, the support base, posts, and radiator wall may be formed as a unitary metallized polymer structure, while the director and isolation wall may each be formed as separate pieces. Here the director is shown as being a metal or PCB director and the isolation wall as a metallized polymer structure, although other implementations are possible.

Figure 19D:
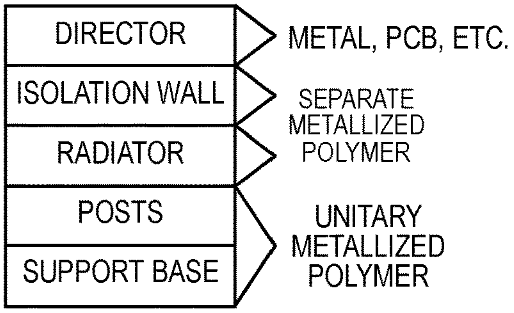
Figure 19E:
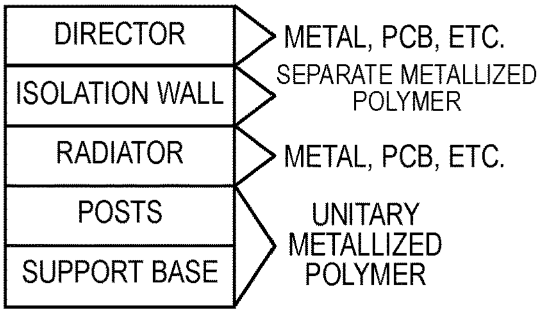

As shown in FIG. 19D, in still other embodiments, only the support base and the posts may be formed as a unitary metallized polymer structure, while the director (if included), isolation wall and radiator may each be formed as separate pieces. For example, the director may comprise sheet metal and the isolation wall and radiator may each be formed as separate metallized polymer structures. As shown in FIG. 19E, in other embodiments, the support base and the posts may again be formed as a unitary metallized polymer structure, while the director and radiator are each formed of sheet metal and the isolation wall is formed as a separate metallized polymer structure.

Figure 19F:
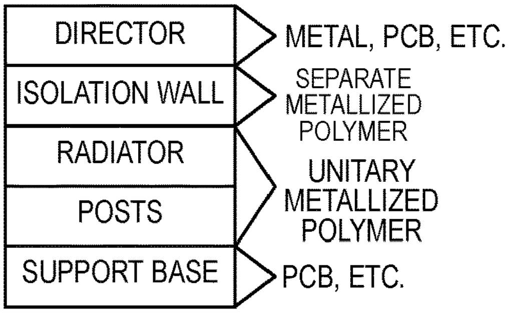
Figure 19G:
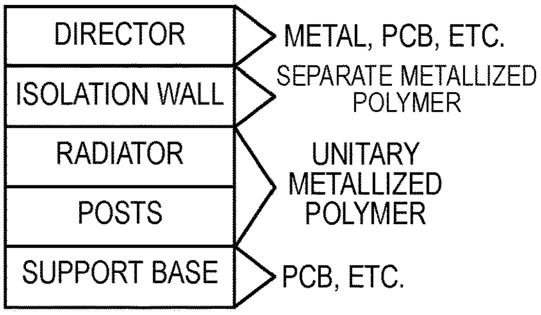
Figure 19H:
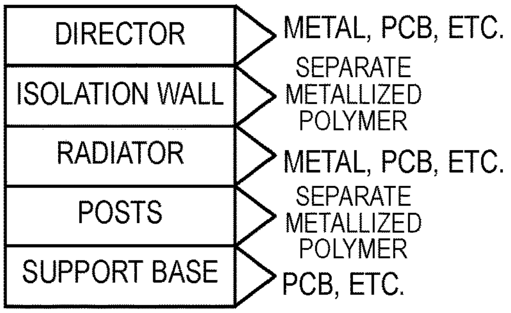

As shown in FIG. 19F, in still other embodiments, the posts and the radiator may be formed as a unitary metallized polymer structure, the isolation wall and support base may each be formed as separate metallized polymer structures, and the director may be formed of sheet metal. As shown in FIG. 19G, in yet additional embodiments, the posts and the radiator may again be formed as a unitary metallized polymer structure, the support base and the director may be formed using printed circuit boards, and the isolation wall may be formed as a separate metallized polymer structure. Finally, as shown in FIG. 19H, in still other embodiments, each component may be formed as a separate structure.

The patch radiating elements according to embodiments of the present invention may be particularly well-suited for use in beamforming antennas, which require multiple relatively closely-spaced columns (e.g., four columns, eight columns, etc.). Due to the large number of columns often used in beamforming arrays, it may be difficult to implement such arrays in the narrow width platforms that are typically desired by cellular operators. The radiating elements according to embodiments of the present invention may be perhaps 15-20% smaller than more conventional radiating elements having similar capabilities, and hence may facilitate reduction in the width of the beamforming array. Moreover, when implemented as metallized polymer-based radiating elements, the antenna assembly process may be simplified and the numbered of soldered connections may be reduced, which may improve the PIM performance of the antenna.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna, comprising:

a cross-polarized feed signal network including first and second metal traces, said cross-polarized feed signal network configured to convert first and second radio frequency (RF) input feed signals received by the first and second metal traces, respectively, to first and second pairs of cross-polarized feed signals at respective first and second pairs of feed signal output ports, which are electrically connected to the first and second metal traces, respectively;

a feed signal pedestal electrically coupled to the first and second pairs of feed signal output ports; and a patch radiating element capacitively coupled to first and second pairs of feed signal lines, which extend on said feed signal pedestal within an at least partially enclosed air-filled cavity, and are electrically connected to the first and second pairs of feed signal output ports.

2. The antenna of claim 1, wherein the first and second pairs of feed signal lines on said feed signal pedestal are solder-bonded to the first and second pairs of feed signal output ports.

3. The antenna of claim 1, further comprising a ring-shaped support frame, which extends between said patch radiating element and said cross-polarized feed signal network.

4. The antenna of claim 1, wherein the first and second pairs of feed signal lines extend at least partially through the at least partially enclosed air-filled cavity to the cross-polarized feed signal network.

5. The antenna of claim 4, wherein the feed signal pedestal comprises an annular-shaped polymer having a cylindrically-shaped cavity therein.

6. The antenna of claim 5, wherein the first and second pairs of feed signal lines are solder-bonded to the first and second pairs of feed signal output ports.

7. The antenna of claim 4, further comprising a dielectric loading extension, which extends into the at least partially enclosed air-filled cavity.

8. An antenna, comprising:

a cross-polarized feed signal network including first and second metal traces, said cross-polarized feed signal network configured to convert first and second radio frequency (RF) input feed signals received by the first and second metal traces, respectively, to first and second pairs of cross-polarized feed signals at respective first and second pairs of feed signal output ports, which are electrically connected to the first and second metal traces, respectively;

a feed signal pedestal electrically coupled to the first and second pairs of feed signal output ports;

a patch radiating element capacitively coupled to first and second pairs of feed signal lines, which extend on said feed signal pedestal and are electrically connected to the first and second pairs of feed signal output ports; and a ring-shaped support frame, which extends between said patch radiating element and said cross-polarized feed signal network, said ring-shaped support frame configured to define an electromagnetically-shielded cavity that surrounds at least a portion of said feed signal pedestal.

9. The antenna of claim 8, wherein said ring-shaped support frame comprises at least one of a metallized interior surface facing said feed signal pedestal and a metallized exterior surface.

10. An antenna, comprising:

a cross-polarized feed signal network including first and second metal traces, said cross-polarized feed signal network configured to convert first and second radio frequency (RF) input feed signals received by the first and second metal traces, respectively, to first and second pairs of cross-polarized feed signals at respective first and second pairs of feed signal output ports, which are electrically connected to the first and second metal traces, respectively;

a feed signal pedestal electrically coupled to the first and second pairs of feed signal output ports, said feed signal pedestal comprising an annular-shaped polymer having a cylindrically-shaped cavity therein; and a patch radiating element capacitively coupled to first and second pairs of feed signal lines, which extend on said feed signal pedestal and are electrically connected to the first and second pairs of feed signal output ports.

11. The antenna of claim 10, wherein the first and second pairs of feed signal lines extend along an exterior of the annular-shaped polymer.

12. The antenna of claim 11, wherein the first and second pairs of feed signal lines extend parallel to a longitudinal axis of the cylindrically-shaped cavity within the feed signal pedestal.

13. The antenna of claim 9, wherein said cross-polarized feed signal network comprises a printed circuit board having ground plane thereon that contacts a metallized portion of said ring-shaped support frame.

14. An antenna, comprising:

a cross-polarized feed signal network including first and second metal traces, said cross-polarized feed signal network configured to convert first and second radio frequency (RF) input feed signals received by the first and second metal traces, respectively, to first and second pairs of cross-polarized feed signals at respective first and second pairs of feed signal output ports, which are electrically connected to the first and second metal traces, respectively; and a patch carrier comprising a polymer and first and second pairs of feed signal lines, and having a patch radiating element thereon, which is capacitively coupled to the first and second pairs of feed signal output ports; and wherein the patch radiating element is capacitively coupled to arcuate-shaped distal ends of the first and second pairs of feed signal lines and extends adjacent an exterior surface of said patch carrier.

15. The antenna of claim 14, further comprising a ring-shaped support frame, which extends between said patch carrier and said cross-polarized feed signal network.

16. An antenna, comprising:

a cross-polarized feed signal network including first and second metal traces, said cross-polarized feed signal network configured to convert first and second radio frequency (RF) input feed signals received by the first and second metal traces, respectively, to first and second pairs of cross-polarized feed signals at respective first and second pairs of feed signal output ports, which are electrically connected to the first and second metal traces, respectively;

a feed signal pedestal electrically coupled to the first and second pairs of feed signal output ports, said feed signal pedestal having first and second pairs of feed signal lines thereon, which are coupled to the patch radiating element and extend at least partially through an electromagnetically-shielded cavity to the cross-polarized feed signal network; and a patch radiating element electrically coupled by said feed signal pedestal to the first and second pairs of feed signal output ports;

wherein the cross-polarized feed signal network comprises a printed circuit board having a ground plane thereon; and wherein the first and second pairs of feed signal lines are solder-bonded to portions of the cross-polarized feed signal network extending within openings in the ground plane.

* * * * *